(12) United States Patent
Py

(10) Patent No.: US 7,644,842 B2
(45) Date of Patent: *Jan. 12, 2010

(54) DISPENSER HAVING VARIABLE-VOLUME STORAGE CHAMBER AND DEPRESSIBLE ONE-WAY VALVE ASSEMBLY FOR DISPENSING CREAMS AND OTHER SUBSTANCES

(75) Inventor: Daniel Py, Larchmont, NY (US)

(73) Assignee: Medical Instill Technologies, Inc., New Milford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/897,928

(22) Filed: Aug. 31, 2007

(65) Prior Publication Data
US 2008/0105712 A1   May 8, 2008

Related U.S. Application Data

(63) Continuation of application No. 11/043,365, filed on Jan. 26, 2005, now Pat. No. 7,264,142.

(60) Provisional application No. 60/613,612, filed on Sep. 27, 2004, provisional application No. 60/539,603, filed on Jan. 27, 2004.

(51) Int. Cl.
B65D 88/54 (2006.01)
(52) U.S. Cl. .................. 222/321.7; 222/1; 222/207; 222/257; 222/260; 222/380; 222/494
(58) Field of Classification Search .................. 222/95, 222/105, 321.7, 372, 321.9, 380, 340–341, 222/385, 183, 321.6, 209, 383.1, 494, 256–260, 222/137, 207, 1
See application file for complete search history.

(56) References Cited

U.S. PATENT DOCUMENTS 1,471,091 A   10/1923   Bessesen (Continued)

FOREIGN PATENT DOCUMENTS

CA   1 123 792   5/1992

(Continued)

OTHER PUBLICATIONS

U.S. Appl. No. 29/214,038, filed Sep. 27, 2004.

(Continued)

*Primary Examiner*—Frederick C. Nicolas
(74) *Attorney, Agent, or Firm*—McCarter & English, LLP

(57) ABSTRACT

A dispenser has a housing, and a variable-volume storage chamber formed within the housing and defining a substantially fluid-tight seal between the chamber and exterior of the housing for storing a substance to be dispensed. A piston is mounted within the housing, and a one-way valve is mounted within the housing and coupled in fluid communication with the variable-volume storage chamber. A compression chamber is coupled in fluid communication between the piston and one-way valve, and at least one of the piston and valve is manually depressible relative to the other between (i) a first position in which the piston is located at least partially outside of the compression chamber for permitting substance to flow from the variable-volume storage chamber into the compression chamber, and (ii) a second position in which the piston is located at least partially within the compression chamber for pressurizing substance within the compression chamber above a valve opening pressuring and, in turn, dispensing substance through the one-way valve and out of the dispenser.

31 Claims, 15 Drawing Sheets

U.S. PATENT DOCUMENTS

| | | |
|---|---|---|
| 1,978,455 A | 10/1934 | Geerlings |
| 2,014,881 A | 9/1935 | Carlstrum |
| 2,128,035 A | 8/1938 | Boetel |
| 2,317,270 A | 4/1943 | Harris |
| 2,471,852 A | 5/1949 | Bau |
| 2,522,403 A | 9/1950 | Ross |
| 2,648,334 A | 8/1953 | Brown et al. |
| 2,667,986 A | 2/1954 | Perelson |
| 2,687,133 A | 8/1954 | Schwarz |
| 2,715,980 A | 8/1955 | Frick |
| 2,951,584 A | 9/1960 | Bauer |
| 3,123,661 A | 3/1964 | Roman |
| 3,136,440 A | 6/1964 | Krug et al. |
| 3,160,329 A | 12/1964 | Radic et al. |
| 3,235,128 A | 2/1966 | Hansen |
| 3,278,063 A | 10/1966 | Kranzhoff |
| 3,353,718 A | 11/1967 | McLay |
| 3,356,093 A | 12/1967 | Monahon |
| 3,392,859 A | 7/1968 | Fischer |
| 3,412,910 A | 11/1968 | Hahn |
| 3,448,896 A | 6/1969 | Kobayashi et al. |
| 3,648,903 A | 3/1972 | Marchant |
| 3,659,749 A | 5/1972 | Schwartz |
| 3,662,753 A | 5/1972 | Tassell |
| 3,669,323 A | 6/1972 | Harker et al. |
| 3,699,961 A | 10/1972 | Szpur |
| 3,756,729 A | 9/1973 | Tufts |
| 3,811,591 A | 5/1974 | Novitch |
| 3,838,689 A | 10/1974 | Cohen |
| 3,921,333 A | 11/1975 | Clendinning et al. |
| 3,963,814 A | 6/1976 | Cospen et al. |
| 3,987,938 A | 10/1976 | Coopride et al. |
| 3,993,069 A | 11/1976 | Buckles et al. |
| 4,002,516 A | 1/1977 | Gaborieau et al. |
| 4,023,607 A | 5/1977 | Jensen et al. |
| 4,048,255 A | 9/1977 | Hillier et al. |
| 4,050,459 A | 9/1977 | Sanchez |
| 4,099,651 A | 7/1978 | Von Winckelmann |
| 4,102,476 A | 7/1978 | Loeffler |
| 4,141,474 A | 2/1979 | Nilson |
| 4,168,020 A | 9/1979 | Benson |
| 4,185,628 A | 1/1980 | Kopfer |
| 4,189,065 A | 2/1980 | Herold |
| 4,216,236 A | 8/1980 | Mueller et al. |
| 4,233,262 A | 11/1980 | Curto |
| 4,239,132 A | 12/1980 | Mueller et al. |
| 4,240,465 A | 12/1980 | Rader |
| 4,264,018 A | 4/1981 | Warren |
| 4,346,708 A | 8/1982 | LeVeen et al. |
| 4,366,912 A | 1/1983 | Matakura et al. |
| 4,367,739 A | 1/1983 | LeVeen et al. |
| 4,390,111 A | 6/1983 | Robbins et al. |
| 4,420,100 A | 12/1983 | Mueller |
| 4,425,366 A | 1/1984 | Sozzie et al. |
| 4,425,698 A | 1/1984 | Petrie |
| 4,444,330 A | 4/1984 | Kasai et al. |
| 4,458,830 A | 7/1984 | Werding |
| 4,475,905 A | 10/1984 | Himmelstrup |
| 4,479,578 A | 10/1984 | Brignola et al. |
| 4,479,989 A | 10/1984 | Mahal |
| 4,482,585 A | 11/1984 | Ohodaira et al. |
| 4,493,348 A | 1/1985 | Lemmons |
| 4,499,148 A | 2/1985 | Goodale et al. |
| 4,501,781 A | 2/1985 | Kushida et al. |
| 4,513,891 A | 4/1985 | Hain et al. |
| 4,526,294 A | 7/1985 | Hirschmann et al. |
| 4,561,571 A | 12/1985 | Chen |
| 4,578,295 A | 3/1986 | Jabarin |
| 4,579,757 A | 4/1986 | Su et al. |
| 4,603,066 A | 7/1986 | Jabarin |
| 4,607,764 A | 8/1986 | Christine |
| 4,624,594 A | 11/1986 | Sasaki et al. |
| 4,636,412 A | 1/1987 | Field |
| 4,643,723 A | 2/1987 | Smit |
| 4,699,300 A | 10/1987 | Blake |
| 4,700,838 A | 10/1987 | Falciani et al. |
| 4,704,510 A | 11/1987 | Matsui |
| 4,722,459 A | 2/1988 | Goncalves |
| 4,737,148 A | 4/1988 | Blake |
| 4,739,906 A | 4/1988 | LoTurco |
| 4,776,495 A | 10/1988 | Vignot |
| 4,776,717 A | 10/1988 | Iizuka et al. |
| 4,784,652 A | 11/1988 | Wikström |
| 4,815,619 A | 3/1989 | Turner et al. |
| 4,823,990 A | 4/1989 | Roggenburg et al. |
| 4,834,152 A | 5/1989 | Howson et al. |
| 4,842,165 A | 6/1989 | Van Coney |
| 4,854,481 A | 8/1989 | Bohl et al. |
| 4,854,483 A | 8/1989 | Haggart |
| 4,854,486 A | 8/1989 | Daley et al. |
| 4,859,513 A | 8/1989 | Gibbons et al. |
| 4,865,591 A | 9/1989 | Sams |
| 4,880,675 A | 11/1989 | Mehta |
| 4,895,279 A | 1/1990 | Schultz |
| 4,903,741 A | 2/1990 | Ibanez |
| 4,910,147 A | 3/1990 | Bacehowski et al. |
| 4,910,435 A | 3/1990 | Wakalopulos |
| 4,921,733 A | 5/1990 | Gibbons et al. |
| 4,923,480 A | 5/1990 | Monestere |
| 4,936,833 A | 6/1990 | Sams |
| 4,949,877 A | 8/1990 | Hanna et al. |
| 4,962,868 A | 10/1990 | Borchard |
| 4,973,318 A | 11/1990 | Holm et al. |
| 4,978,036 A | 12/1990 | Burd |
| 4,981,479 A | 1/1991 | Py |
| 5,009,654 A | 4/1991 | Minshall et al. |
| 5,031,675 A | 7/1991 | Lindgren |
| 5,033,647 A | 7/1991 | Smith et al. |
| 5,074,440 A | 12/1991 | Clements et al. |
| 5,083,416 A | 1/1992 | Schneider et al. |
| 5,088,995 A | 2/1992 | Packard et al. |
| 5,099,885 A | 3/1992 | Nilsson |
| 5,102,705 A | 4/1992 | Yammoto et al. |
| 5,108,007 A | 4/1992 | Smith et al. |
| 5,129,212 A | 7/1992 | Duffey et al. |
| 5,143,236 A | 9/1992 | Gueret |
| 5,145,083 A | 9/1992 | Takahashi |
| 5,176,510 A | 1/1993 | Nilsson |
| 5,178,300 A | 1/1993 | Haviv et al. |
| 5,197,638 A | 3/1993 | Wood |
| 5,226,568 A | 7/1993 | Newton et al. |
| 5,226,895 A | 7/1993 | Harris |
| 5,238,153 A | 8/1993 | Castillo et al. |
| 5,244,465 A | 9/1993 | Michel |
| 5,253,785 A | 10/1993 | Haber et al. |
| 5,257,696 A | 11/1993 | Greene |
| 5,263,946 A | 11/1993 | Klug |
| 5,267,986 A | 12/1993 | Py |
| 5,290,260 A | 3/1994 | Stines |
| 5,318,204 A | 6/1994 | Davis et al. |
| 5,320,256 A | 6/1994 | Wood |
| 5,320,845 A | 6/1994 | Py |
| 5,332,121 A | 7/1994 | Schmidt et al. |
| 5,339,972 A | 8/1994 | Crosnier et al. |
| 5,360,145 A | 11/1994 | Gueret |
| 5,366,108 A | 11/1994 | Darling |
| 5,401,259 A | 3/1995 | Py |
| 5,409,146 A | 4/1995 | Hazard et al. |
| 5,414,267 A | 5/1995 | Wakalopulos |
| 5,416,303 A | 5/1995 | Grooms et al. |
| 5,419,465 A | 5/1995 | Schroeder |
| 5,425,465 A | 6/1995 | Healy |
| 5,429,254 A | 7/1995 | Christine |
| 5,484,566 A | 1/1996 | Gabbard |

| | | | | | | |
|---|---|---|---|---|---|---|
| 5,489,026 | A | 2/1996 | D'Aloia | 6,033,384 | A | 3/2000 | Py |
| 5,489,027 | A | 2/1996 | Goerigk | 6,050,435 | A | 4/2000 | Bush et al. |
| RE35,187 | E | 3/1996 | Gortz | 6,050,444 | A | 4/2000 | Sugg |
| 5,496,302 | A | 3/1996 | Minshall | 6,053,370 | A | 4/2000 | Ludbrook et al. |
| 5,497,910 | A | 3/1996 | Meadows et al. | 6,053,433 | A | 4/2000 | Py |
| 5,499,758 | A | 3/1996 | McCann et al. | 6,053,893 | A | 4/2000 | Bucher |
| RE35,203 | E | 4/1996 | Wakalopulos | 6,062,430 | A | 5/2000 | Fuchs |
| D368,774 | S | 4/1996 | Py | 6,062,437 | A | 5/2000 | Mascitelli |
| 5,545,147 | A | 8/1996 | Harris | 6,083,201 | A | 7/2000 | Skinkle |
| 5,556,678 | A | 9/1996 | Jupin et al. | 6,083,450 | A | 7/2000 | Safian |
| D374,719 | S | 10/1996 | Py | 6,092,695 | A | 7/2000 | Loeffler |
| 5,562,960 | A | 10/1996 | Sugiura et al. | 6,140,657 | A | 10/2000 | Wakalopulos et al. |
| 5,564,596 | A | 10/1996 | Meadows et al. | 6,145,707 | A | 11/2000 | Baudin |
| 5,565,160 | A | 10/1996 | Makuuchi et al. | 6,149,957 | A | 11/2000 | Mandralis et al. |
| 5,582,330 | A | 12/1996 | Iba | 6,168,037 | B1 | 1/2001 | Grimard |
| 5,582,598 | A | 12/1996 | Chanoch | 6,170,705 | B1 | 1/2001 | Schneider et al. |
| 5,591,136 | A | 1/1997 | Gabriel | 6,170,715 | B1 | 1/2001 | Evans |
| 5,609,273 | A | 3/1997 | Firestone et al. | RE37,047 | E | 2/2001 | Py |
| 5,612,588 | A | 3/1997 | Wakalopulos | 6,182,698 | B1 | 2/2001 | Barak |
| 5,613,957 | A | 3/1997 | Py | 6,186,686 | B1 | 2/2001 | Neuner et al. |
| 5,615,795 | A | 4/1997 | Tipps | 6,193,698 | B1 | 2/2001 | Kirchhofer et al. |
| 5,630,800 | A | 5/1997 | Blank et al. | 6,200,047 | B1 | 3/2001 | Holloway |
| 5,636,930 | A | 6/1997 | Holloway | 6,202,901 | B1 | 3/2001 | Gerber et al. |
| 5,641,004 | A | 6/1997 | Py | 6,213,982 | B1 | 4/2001 | Py |
| 5,664,704 | A | 9/1997 | Meadows et al. | 6,234,363 | B1 | 5/2001 | Stradella |
| 5,676,267 | A | 10/1997 | Slat et al. | 6,254,579 | B1 | 7/2001 | Cogger et al. |
| 5,685,869 | A | 11/1997 | Py | 6,267,768 | B1 | 7/2001 | Deacon et al. |
| 5,687,882 | A | 11/1997 | Mueller | 6,280,421 | B1 | 8/2001 | Kirchhofer et al. |
| 5,692,651 | A | 12/1997 | Fuchs | 6,283,976 | B1 | 9/2001 | Portney |
| 5,702,019 | A | 12/1997 | Grimard | 6,290,679 | B1 | 9/2001 | Hostettler et al. |
| 5,718,334 | A | 2/1998 | Demel | 6,301,767 | B1 | 10/2001 | Granger et al. |
| 5,727,892 | A | 3/1998 | Baudin | 6,302,101 | B1 | 10/2001 | Py |
| 5,728,075 | A | 3/1998 | Levander | 6,306,423 | B1 | 10/2001 | Donovan et al. |
| 5,730,322 | A | 3/1998 | Iba et al. | 6,312,708 | B1 | 11/2001 | Donovan |
| 5,738,067 | A | 4/1998 | Landwehr | 6,325,253 | B1 | 12/2001 | Robinson |
| 5,743,441 | A | 4/1998 | Baudin et al. | 6,338,442 | B1 | 1/2002 | De Laforcade |
| 5,743,889 | A | 4/1998 | Sams | 6,343,713 | B1 | 2/2002 | Abplanalp |
| 5,746,728 | A | 5/1998 | Py | 6,351,924 | B1 | 3/2002 | Gustafsson et al. |
| 5,755,269 | A | 5/1998 | Venooker et al. | 6,357,945 | B1 | 3/2002 | Losier et al. |
| 5,759,218 | A | 6/1998 | Martin et al. | 6,364,864 | B1 | 4/2002 | Mohiuddin et al. |
| 5,772,079 | A | 6/1998 | Gueret | 6,371,129 | B1 | 4/2002 | Le Bras-Brown et al. |
| 5,772,347 | A | 6/1998 | Gueret | 6,383,167 | B2 | 5/2002 | Kirchhofer et al. |
| 5,780,130 | A | 7/1998 | Hansen et al. | 6,383,509 | B1 | 5/2002 | Donovan et al. |
| 5,785,683 | A | 7/1998 | Szapiro et al. | 6,386,395 | B1 | 5/2002 | Lunghetti |
| 5,799,837 | A | 9/1998 | Firestone et al. | 6,419,412 | B1 | 7/2002 | Ostrowski et al. |
| 5,803,311 | A | 9/1998 | Fuchs | 6,428,545 | B2 | 8/2002 | Portney |
| 5,804,236 | A | 9/1998 | Frisk | 6,446,844 | B1 | 9/2002 | Gross |
| 5,816,772 | A | 10/1998 | Py | 6,450,994 | B1 | 9/2002 | Boyles et al. |
| 5,823,397 | A | 10/1998 | Gil | 6,455,093 | B1 | 9/2002 | Furrer et al. |
| 5,829,901 | A | 11/1998 | Brown et al. | 6,471,095 | B1 | 10/2002 | Cann |
| 5,836,484 | A | 11/1998 | Gerber | 6,485,470 | B2 | 11/2002 | Hostettler et al. |
| 5,855,302 | A | 1/1999 | Fisscher | 6,491,189 | B2 | 12/2002 | Friedman |
| 5,860,755 | A | 1/1999 | Bunk | 6,502,725 | B1 | 1/2003 | Alexander |
| 5,875,931 | A | 3/1999 | Py | 6,505,622 | B2 | 1/2003 | Py |
| 5,876,372 | A | 3/1999 | Grabenkort et al. | 6,533,482 | B1 | 3/2003 | Byun |
| 5,879,095 | A | 3/1999 | Gueret | 6,561,383 | B1 | 5/2003 | Reddy et al. |
| 5,879,336 | A | 3/1999 | Brinon | 6,592,918 | B2 | 7/2003 | Kaeser |
| 5,899,624 | A | 5/1999 | Thompson | 6,592,922 | B2 | 7/2003 | Furrer et al. |
| 5,909,032 | A | 6/1999 | Wakalopulos | 6,604,561 | B2 | 8/2003 | Py |
| 5,921,989 | A | 7/1999 | Deacon et al. | 6,662,977 | B2 | 12/2003 | Gerber et al. |
| 5,927,550 | A | 7/1999 | Mack et al. | 6,695,173 | B1 | 2/2004 | Fontana |
| 5,931,386 | A | 8/1999 | Jouillat | 6,742,680 | B2 | 6/2004 | Friedman |
| 5,934,500 | A | 8/1999 | Cogger et al. | 6,755,327 | B1 | 6/2004 | Hazard et al. |
| 5,944,702 | A | 8/1999 | Py | D493,366 | S | 7/2004 | Rackwitz |
| 5,971,181 | A | 10/1999 | Niedospial, Jr. et al. | 6,761,286 | B2 | 7/2004 | Py et al. |
| 5,971,224 | A | 10/1999 | Garibaldi | 6,769,627 | B2 | 8/2004 | Carhuff et al. |
| RE36,410 | E | 11/1999 | Meshberg | 6,892,906 | B2 | 5/2005 | Py et al. |
| 5,983,905 | A | 11/1999 | Patching | 6,971,553 | B2 | 12/2005 | Brennan et al. |
| 5,996,845 | A | 12/1999 | Chan | 7,264,142 | B2 * | 9/2007 | Py .................. 222/321.7 |
| 6,003,733 | A | 12/1999 | Wheeler | 7,278,553 | B2 | 10/2007 | Py et al. |
| 6,004,298 | A | 12/1999 | Levander | 7,322,491 | B2 | 1/2008 | Py et al. |
| 6,024,252 | A | 2/2000 | Clyde | 2001/0009990 | A1 | 7/2001 | Hostettler et al. |
| 6,032,101 | A | 2/2000 | Freedman et al. | 2001/0027827 | A1 | 10/2001 | Jeannin et al. |

| | | |
|---|---|---|
| 2001/0041872 A1 | 11/2001 | Paul, Jr. |
| 2002/0006353 A1 | 1/2002 | Bilstad et al. |
| 2002/0010995 A1 | 1/2002 | Thibault et al. |
| 2002/0017294 A1 | 2/2002 | Py |
| 2002/0018731 A1 | 2/2002 | Bilstad et al. |
| 2002/0023409 A1 | 2/2002 | Py |
| 2002/0029022 A1 | 3/2002 | Naritomi et al. |
| 2002/0050301 A1 | 5/2002 | Jeannin et al. |
| 2002/0071708 A1 | 6/2002 | Fontanet et al. |
| 2002/0074362 A1 | 6/2002 | Py et al. |
| 2002/0124907 A1 | 9/2002 | Crossdale et al. |
| 2002/0131902 A1 | 9/2002 | Levy |
| 2002/0172615 A1 | 11/2002 | Woodworth et al. |
| 2003/0012858 A1 | 1/2003 | Furrer et al. |
| 2003/0057297 A1 | 3/2003 | Py |
| 2003/0082070 A1 | 5/2003 | Liberto et al. |
| 2003/0088216 A1 | 5/2003 | Py |
| 2003/0089743 A1 | 5/2003 | Py et al. |
| 2003/0156973 A1 | 8/2003 | Bilstad et al. |
| 2004/0011820 A1 | 1/2004 | Abergel et al. |
| 2004/0112925 A1 | 6/2004 | Py et al. |
| 2004/0118291 A1 | 6/2004 | Carhuff et al. |
| 2004/0194811 A1 | 10/2004 | Carhuff et al. |
| 2005/0000591 A1 | 1/2005 | Py et al. |
| 2005/0029307 A1 | 2/2005 | Py et al. |
| 2005/0089358 A1 | 4/2005 | Py et al. |
| 2005/0165368 A1 | 7/2005 | Py et al. |
| 2006/0169722 A1 | 8/2006 | Py et al. |

FOREIGN PATENT DOCUMENTS

| | | |
|---|---|---|
| EP | 0172711 | 2/1986 |
| EP | 0616141 | 9/1994 |
| EP | 0 733 559 A | 9/1996 |
| EP | 0802827 B1 | 8/1998 |
| EP | 0649795 B1 | 6/1999 |
| EP | 0673852 B1 | 2/2000 |
| EP | 1546021 | 2/2004 |
| GB | 984149 | 2/1965 |
| GB | 2 364 700 | 2/2002 |
| JP | 06-239379 | 8/1994 |
| JP | 10-156269 | 6/1998 |
| JP | 2002-347812 | 12/2002 |
| JP | 05-016950 | 1/2003 |
| JP | 2005-535530 | 11/2005 |
| WO | WO 93/16955 | 9/1993 |
| WO | WO 99/41158 | 8/1999 |
| WO | WO 00/29192 | 5/2000 |
| WO | WO 02/40122 | 5/2002 |
| WO | WO 03/033363 | 4/2003 |

OTHER PUBLICATIONS

European Search Report for European Application No. EP 05 71 2468, dated Aug. 20, 2009.

* cited by examiner

DISPENSER HAVING VARIABLE-VOLUME STORAGE CHAMBER AND DEPRESSIBLE ONE-WAY VALVE ASSEMBLY FOR DISPENSING CREAMS AND OTHER SUBSTANCES

CROSS-REFERENCE TO RELATED APPLICATIONS

This patent application is a continuation of U.S. patent application Ser. No. 11/043,365, filed Jan. 26, 2005, now U.S. Pat. No. 7,264,142, which claims the benefit of U.S. Provisional Patent Application Ser. No. 60/539,603, filed Jan. 27, 2004 and U.S. Provisional Patent Application Ser. No. 60/613,612, filed Sep. 27, 2004, which are hereby expressly incorporated by reference as part of the present disclosure.

FIELD OF THE INVENTION

The present invention relates to dispensers for containing and dispensing fluids, such as creams, gels and other substances, and more particularly, to dispensers that include variable-volume storage chambers for holding multiple doses of such substances, one-way valves for hermetically sealing the substances within the dispensers and dispensing the substances therefrom, actuators for actuating pumps within the dispensers and dispensing metered doses of substances through the one-way valves.

BACKGROUND INFORMATION

Prior art dispensers for storing and dispensing multiple doses of creams, gels and other fluids or substances, such as cosmetic dispensers for dispensing, for example, creams or gels for application to the skin, typically do not store the product in a hermetically sealed storage chamber. In addition, such dispensers may be exposed to, or are applied to a user's skin that may contain, dirt, germs, bacteria and/or other unwanted contaminants. Such contaminants can penetrate through the dispensing openings in the dispensers and, in turn, contaminate the bulk of the product, such as a cream or gel, stored within the dispensers. As a result, the contaminants can be passed from one user to another or otherwise cause unhealthy conditions with further usage of the dispensers. Further, because the products stored within the dispensers are exposed to air, the products can degrade or spoil, and/or require preservatives to prevent such degradation and/or spoilage from occurring. In some circumstances, preservatives can cause allergic and/or other undesirable or negative reactions, such as unwanted dermatological reactions.

It is an object of the present invention, therefore, to overcome one or more of the above-described drawbacks and/or disadvantages of the prior art.

SUMMARY OF THE INVENTION

Exemplary embodiments of the invention include a dispenser comprising a housing, and a variable-volume storage chamber formed within the housing and defining a substantially fluid-tight seal between the chamber and exterior of the housing for storing a substance to be dispensed. A piston is mounted within the housing, and a one-way valve is mounted within the housing and coupled in fluid communication with the variable-volume storage chamber. A compression chamber is coupled in fluid communication between the piston and one-way valve, and at least one of the piston and valve is manually depressible relative to the other between (i) a first position in which the piston is located at least partially outside of the compression chamber for permitting substance to flow from the variable-volume storage chamber into the compression chamber, and (ii) a second position in which the piston is located at least partially within the compression chamber for pressurizing substance within the compression chamber above a valve opening pressuring and, in turn, dispensing substance through the one-way valve and out of the dispenser.

In some embodiments of the present invention, the dispenser further comprises a biasing member for biasing at least one of the piston and valve in the direction from the second position toward the first position. In one embodiment of the present invention, the biasing member is at least one of a coil spring and a resilient, elastomeric spring. In one embodiment, the resilient, elastomeric spring is approximately dome shaped.

In some embodiments of the present invention, the one-way valve includes an axially-extending valve seat, and an axially-extending flexible valve cover seated on the valve seat and defining a normally-closed, axially-extending seam therebetween forming a fluid-tight seal between the valve cover and valve seat. At least one outlet aperture is coupled in fluid communication between the compression chamber and the seam. The flexible valve cover is movable relative to the valve seat, and the seam is connectable in fluid communication with the outlet aperture to allow the passage of substance from the compression chamber through the seam and out of the dispenser. In one embodiment of the present invention, the valve seat defines at least one tapered portion that tapers radially outwardly in the direction from the interior to the exterior of the valve. Preferably, the flexible valve cover forms an interference fit with the valve seat. Also, the flexible valve cover is responsive to a flow of substance in the outlet aperture exceeding a valve opening pressure to move between (i) a normally-closed closed condition, and (ii) an open condition wherein portions of the valve cover axially spaced relative to each other substantially sequentially move substantially radially relative to the valve seat to allow the passage of substance through the seam and out of the dispenser.

In some embodiments of the present invention, the dispenser further comprises a flexible bladder mounted within the housing and defining the variable-volume storage chamber between the bladder and housing.

Preferably, the compression chamber defines a first radial dimension that is substantially equal to or less than a radial dimension of the piston for forming a fluid-tight seal therebetween. In one embodiment of the present invention, the piston includes at least one annular sealing surface forming said radial dimension and fluid tight seal. Also in one embodiment of the present invention, the annular sealing surface is formed by an elastomeric sealing member on the piston.

In some embodiments of the present invention, the piston is fixed relative to the valve, and the valve is manually depressible relative to the piston between the first and second positions. In one such embodiment, the valve includes a valve body defining the compression chamber for receiving therein the piston, and an axially-extending valve seat. The valve further includes an axially-extending flexible valve cover seated on the valve seat and defining a normally-closed, axially-extending seam therebetween forming a fluid-tight seal between the valve cover and valve seat. In one such embodiment, the valve body defines a first bore for receiving the piston in the first position, and a passageway between the first bore and piston for permitting the flow of substance therethrough from the variable-volume storage chamber into the compression chamber. In one embodiment, the valve body further defines at least one outlet aperture coupled in fluid communication between the compression chamber and the valve seam, and a second bore formed between the first bore and the outlet aperture and defining therein the compression chamber. Preferably, the valve body further defines an annular surface that tapers radially inwardly between the first and second bores.

In some embodiments of the present invention, the flexible valve cover includes a first portion connected to the valve body on one side of the seam, and a second portion connected to the housing on an opposite side of the seam relative to the first portion, and a movable portion extending between the second portion and the seam for permitting movement of the valve between the first and second positions. In one such embodiment, the valve body is manually depressible relative to the piston between the first and second positions. Preferably, the valve body includes a manually engagable surface, and the seam extends about a peripheral portion of the manually engagable surface. In one such embodiment, the dispenser further comprises a guide extending between the valve and housing for guiding movement of the valve between the first and second positions. Preferably, a spring is coupled between the guide and housing for biasing the valve in the direction from the second to the first position.

In some embodiments of the present invention, the valve and piston are axially aligned, and the variable-volume storage chamber is spaced radially relative to the valve and piston. Preferably, the variable-volume storage chamber is substantially airless.

In some embodiments of the present invention, the dispenser further comprises a plunger slidably received within the housing and forming a substantially fluid-tight seal therebetween. The variable-volume storage chamber is formed between the plunger and the piston, and the plunger is movable axially upon dispensing a dosage from the storage chamber to reduce the volume of the storage chamber in an amount approximately equal to the volume of the dose dispensed.

In some embodiments of the present invention, a filling port is mounted on the housing, and a second one-way valve is coupled in fluid communication between the filling port and the variable volume storage chamber. In one embodiment of the present invention, the second one-way valve includes an axially-extending valve seat and an axially-extending flexible valve cover seated on the valve seat and defining a normally-closed, axially-extending seam therebetween forming a fluid-tight seal between the valve cover and valve seat. The flexible valve cover is movable relative to the valve seat and the seam is connectable in fluid communication with variable-volume storage chamber to permit the passage of substance through the seam and into the storage chamber.

In some embodiments of the present invention, the piston defines a flow conduit therein coupled in fluid communication between the variable-volume storage chamber and the compression chamber for permitting the flow of substance from the variable-volume storage chamber and into the compression chamber.

In some embodiments of the present invention, the valve cover comprises the area around the periphery of the one-way valve in the dispenser top. This allows for a larger manually engagable surface of the valve cover for actuating the one-way valve used to dispense the cream or other substance. The fill system for the alternative embodiment also comprises a flexible annular shaped valve for passing substance from the fill port into the variable volume storage chamber.

In other embodiments of the invention, the dispenser has a housing, a variable-volume storage chamber, and a one-way valve mounted on the housing and connectible in fluid communication with the variable-volume storage chamber. The one-way valve may dispense substance but prevent it from flowing through the valve in an opposite direction. The one-way valve may include an elastic or flexible arcuate-shaped valve member defining a normally closed arcuate, axially-extending outlet that forms a fluid-tight seal preventing substance from flowing therethrough yet allowing substance within the valve to flow therethrough when the substance exceeds a valve opening pressure. The valve member may form the outlet with a relatively rigid arcuate-shaped valve seat, such that the valve member and valve seat form an interference fit. The dispenser may further include a manually engageable surface that is mounted on the housing, is manually engageable and depressible to actuate the dispenser, is manually depressible between first and second positions, and is normally biased in the direction from the second position toward the first position. The dispenser may further include means for receiving a portion of the substance stored in the variable-volume storage chamber and pressurizing the substance, that is connectible in fluid communication between the variable volume storage chamber and the one-way valve with the following operation. During movement of the manually engageable surface in the direction from the second position toward the first position, the variable-volume storage chamber is in fluid communication with the means, permitting substance to flow from the variable-volume storage chamber into the means. During movement of the manually engageable surface in a direction from the first position toward the second position, the means is not in fluid communication with the variable-volume storage chamber. In addition, the substance within the means is pressurized above the valve opening pressuring and, in turn, dispensed through the normally closed outlet of the one-way valve assembly and out of the dispenser. The means may include a compression chamber.

Yet another aspect of the invention provides methods of storing and dispensing a sterile liquid product. The methods may include the steps of (i) maintaining a sterile liquid product hermetically sealed within a variable-volume storage chamber received within a housing of a dispenser and defining a substantially fluid-tight seal between the chamber and exterior of the housing; (ii) manually engaging a manually engageable surface mounted on the housing and depressing the manually engageable surface between a first position and a second position; (iii) pressurizing the sterile liquid product within a compression chamber of the dispenser above a valve opening pressure during movement of the manually engageable surface in the direction from the first position toward the second position, and in turn dispensing the pressurized sterile liquid product through a normally closed arcuate, axially-extending outlet of a one-way valve mounted on the housing and out of the dispenser, the one-way valve including an elastic arcuate-shaped valve member, and a relatively rigid arcuate-shaped valve seat forming an interference fit and fluid-tight seal therebetween; (iv) allowing a biasing element to move the manually engageable surface in a direction from the second position toward the first position; (v) drawing fluid from the variable-volume storage chamber into the compression chamber during movement of the manually engageable surface in the direction from the second position toward the first position; (vi) dispensing a plurality of different portions of the sterile liquid product at different points in time from the variable-volume storage chamber through the one-way valve by repeating steps (ii) through (v); and (vii) maintaining the sterile liquid product within the variable-volume storage chamber sterile and hermetically sealed with respect to ambient atmosphere throughout steps (i) through (vi).

One advantage of the present invention is that the dispenser can store multiple doses of substances, such as liquids, creams, gels, or other cosmetic or cosmeceutical products, in a hermetically sealed, sterile condition throughout the shelf life and usage of the dispenser. Further, exemplary embodiments of the dispenser can provide metered doses of the liquid, cream, gel or other substance with a simple, one-handed actuation motion.

Other objects and advantages of the present invention will become apparent in view of the following detailed description of the currently preferred embodiments and the accompanying drawings.

DETAILED DESCRIPTION OF THE CURRENTLY PREFERRED EMBODIMENTS

Figure 1:
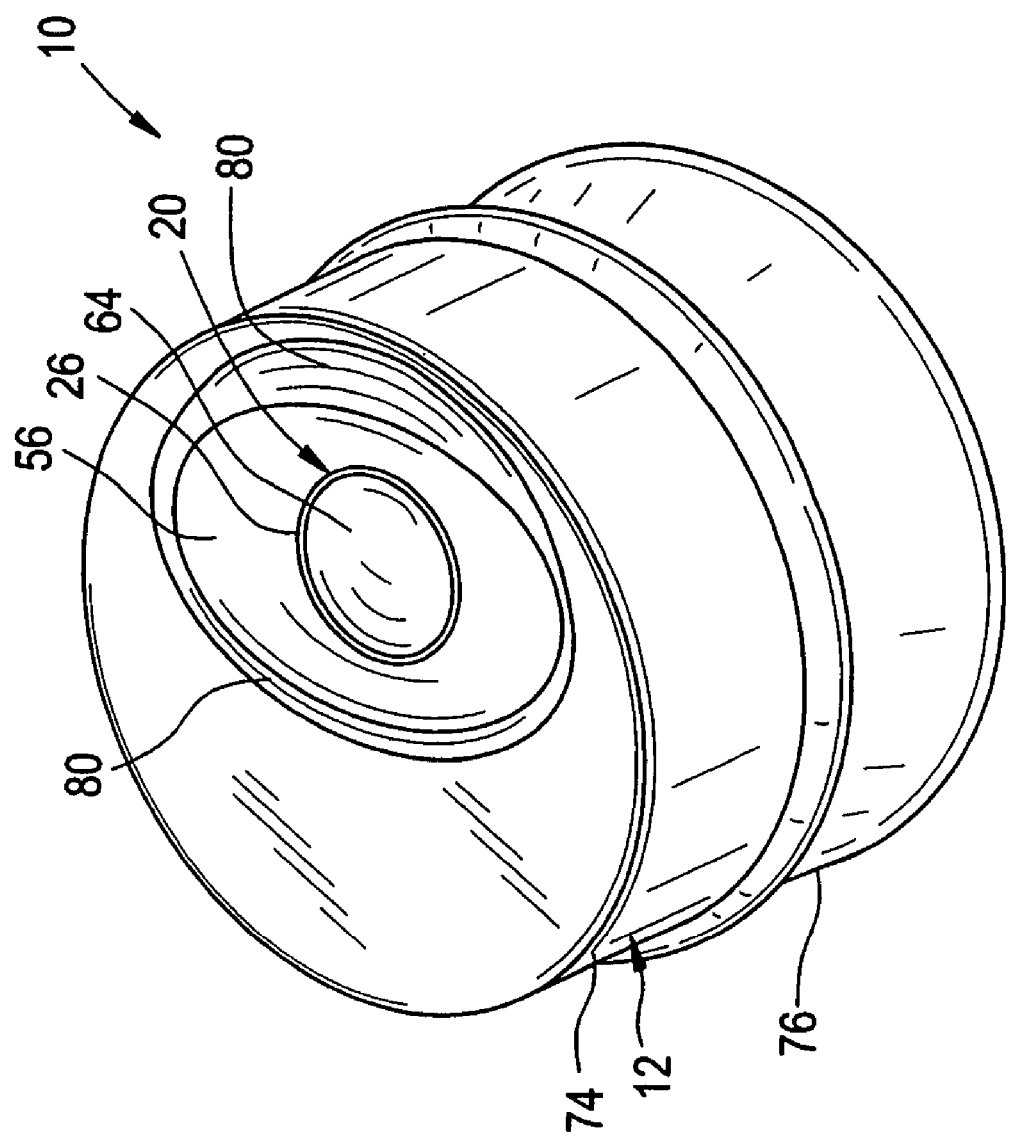
FIG. 1 is an upper perspective view of a dispenser embodying the present invention.
Figure 2:
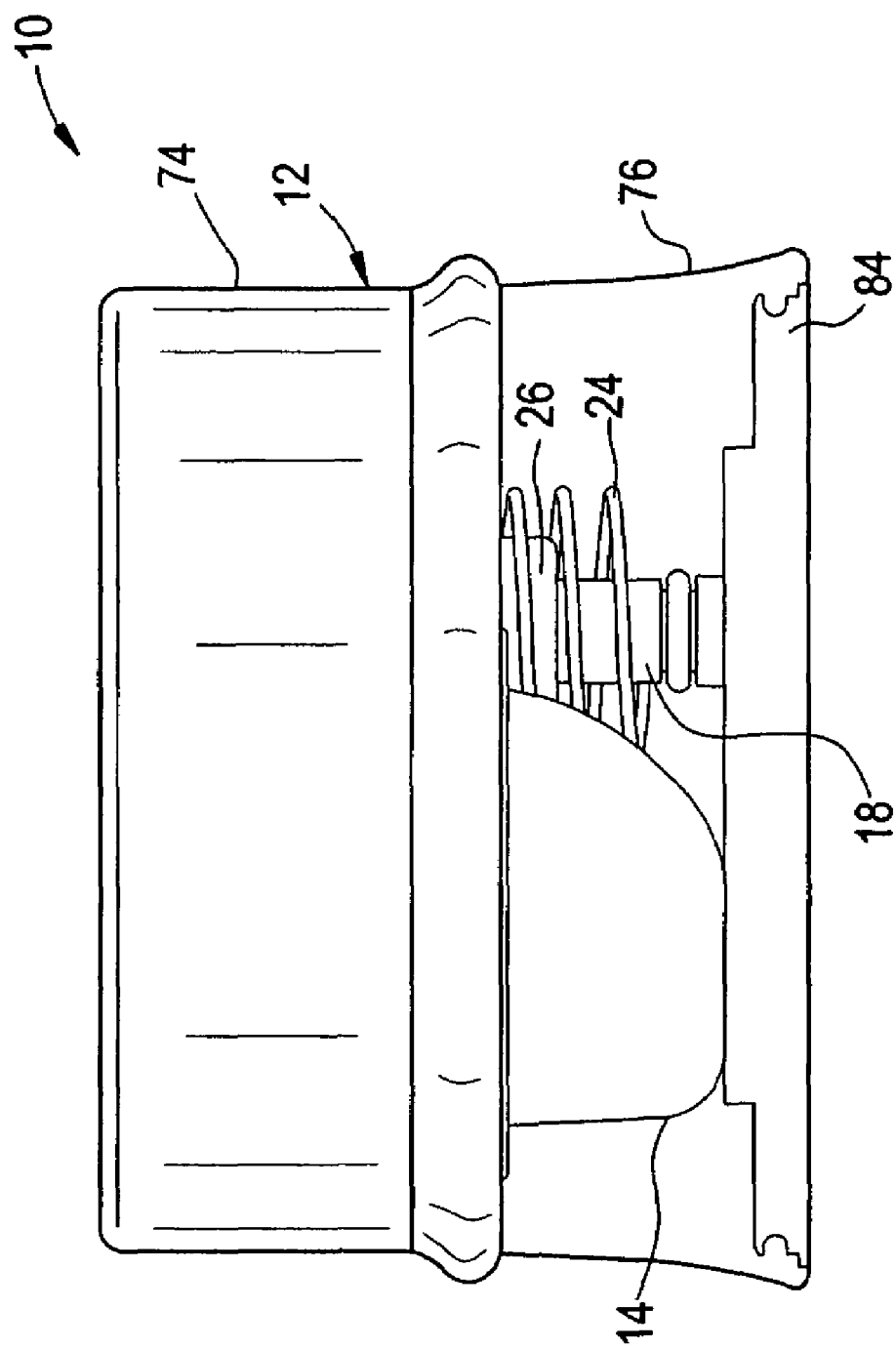
FIG. 2 is a side elevational view of the dispenser of FIG. 1.
Figure 3:
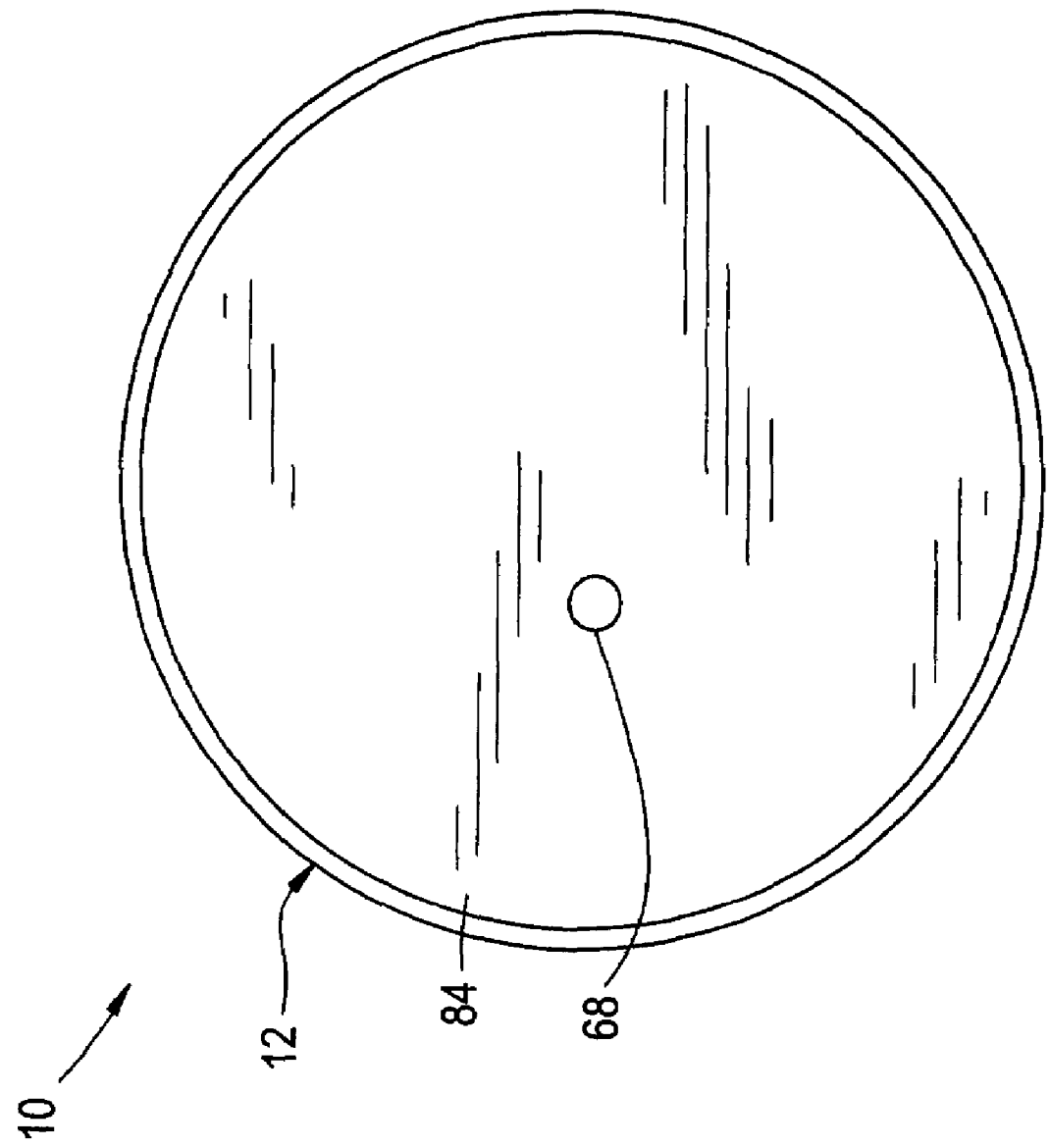
FIG. 3 is a bottom plan view of the dispenser of FIG. 1.
Figure 4:
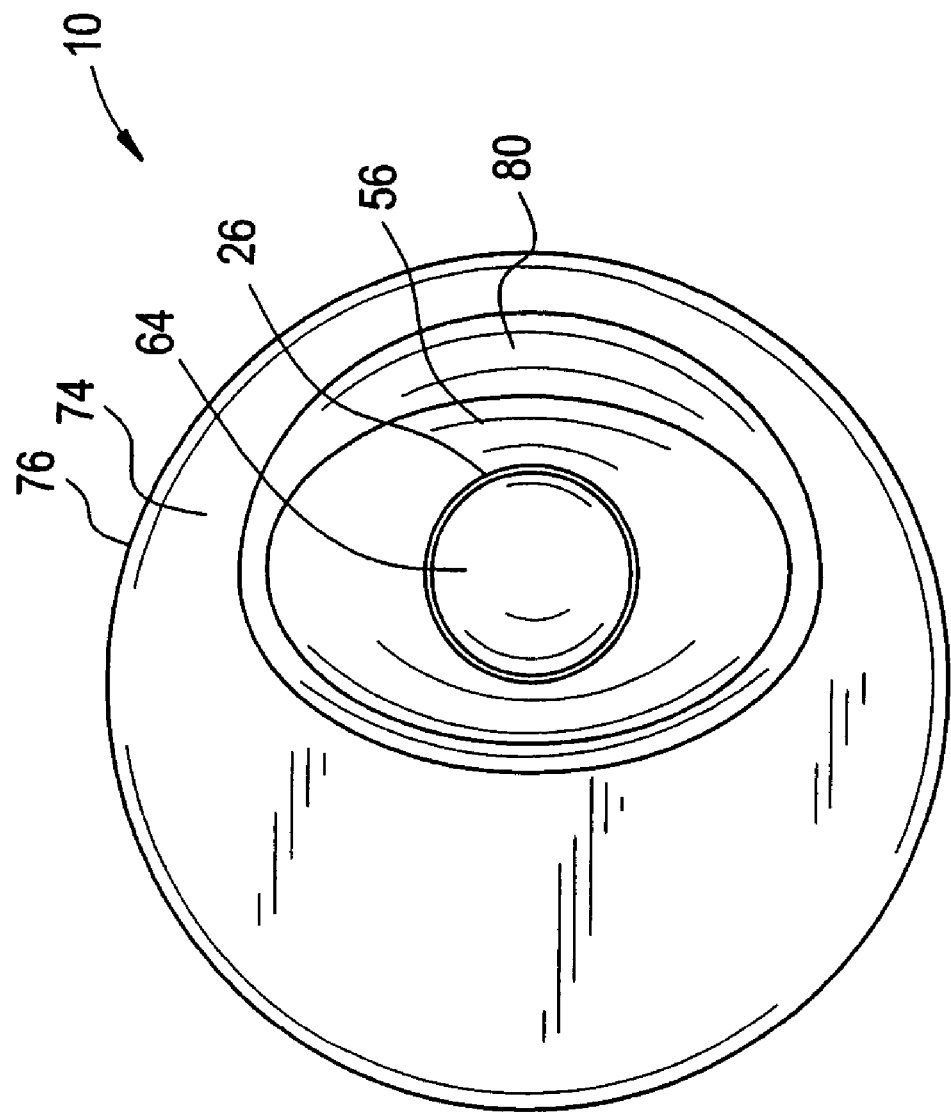
FIG. 4 is a top plan view of the dispenser of FIG. 1.
Figure 5:
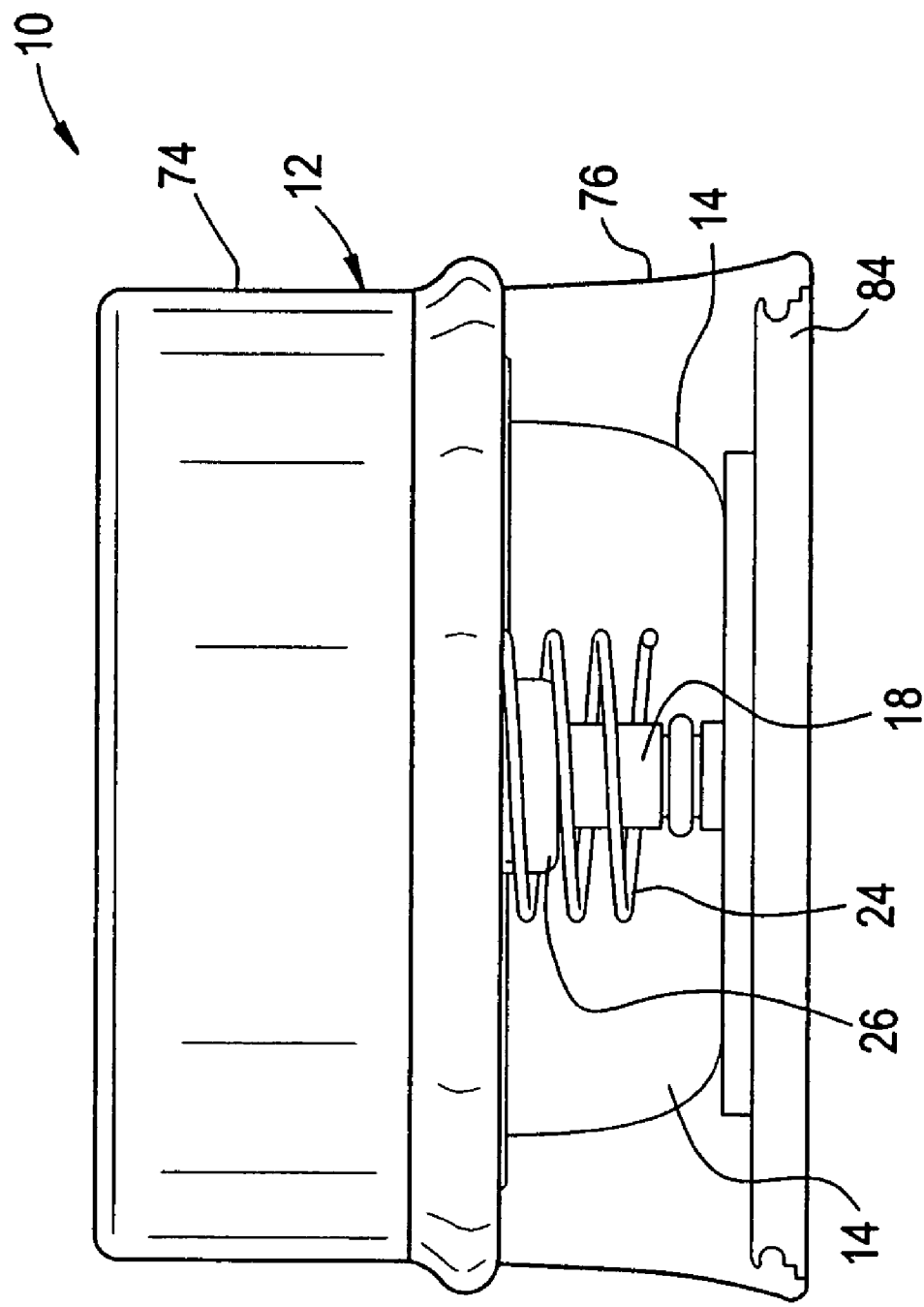
FIG. 5 is another side elevational view of the dispenser of FIG. 1.

Referring to FIGS. 1-12, a dispenser embodying the present invention is indicated generally by the reference numeral 10. The dispenser 10 comprises a housing 12, a variable-volume storage chamber 14 formed within the housing 12 and defining a substantially fluid-tight seal between the chamber 14 and exterior of the housing 12 for storing a substance to be dispensed. A piston 18 is mounted within the housing 12, and a one-way valve 20 also is mounted within the housing and coupled in fluid communication with the variable-volume storage chamber. A compression chamber 22 is coupled in fluid communication between the piston 18 and one-way valve 20 for receiving a predetermined dosage of substance, such as a cream, gel or other substance, from the storage chamber 14, and dispensing same through the valve 20. In accordance with the present invention, at least one of the piston 18 and valve 20 is manually depressible relative to the other between (i) a first position shown typically in FIG. 8 in which the piston 18 is located at least partially outside of the compression chamber 22 for permitting substance to flow from the variable-volume storage chamber 14 into the compression chamber 22, and (ii) a second position shown typically in broken lines in FIG. 10 in which the piston 18 is located at least partially within the compression chamber 22 for pressurizing substance from the storage chamber within the compression chamber above a valve opening pressuring and, in turn, dispensing substance through the one-way valve 20 and out of the dispenser.

In the illustrated embodiment of the present invention, the piston 18 is fixed relative to the one-way valve 20, and the valve 20 is manually depressible relative to the piston between the first and second positions. However, as may be recognized by those of ordinary skill in the pertinent art based on the teachings herein, the one-way valve could be fixed relative to the piston, and the piston could be movable relative to the valve, or both the piston and valve could be movable relative to each other.

Figure 8:
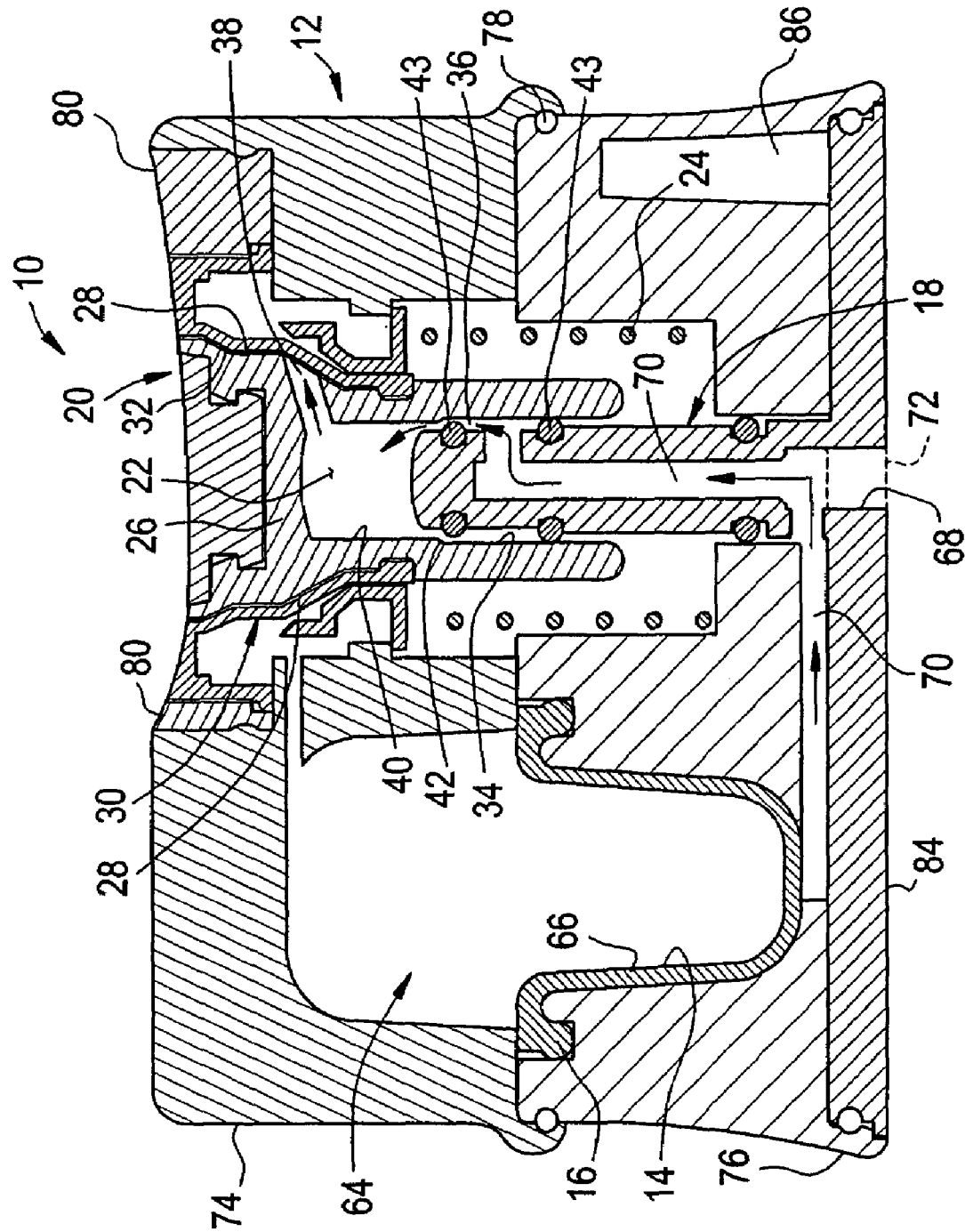
FIG. 8 is a cross-sectional view of the dispenser of FIG. 1 showing the variable-volume storage chamber empty.
Figure 10:
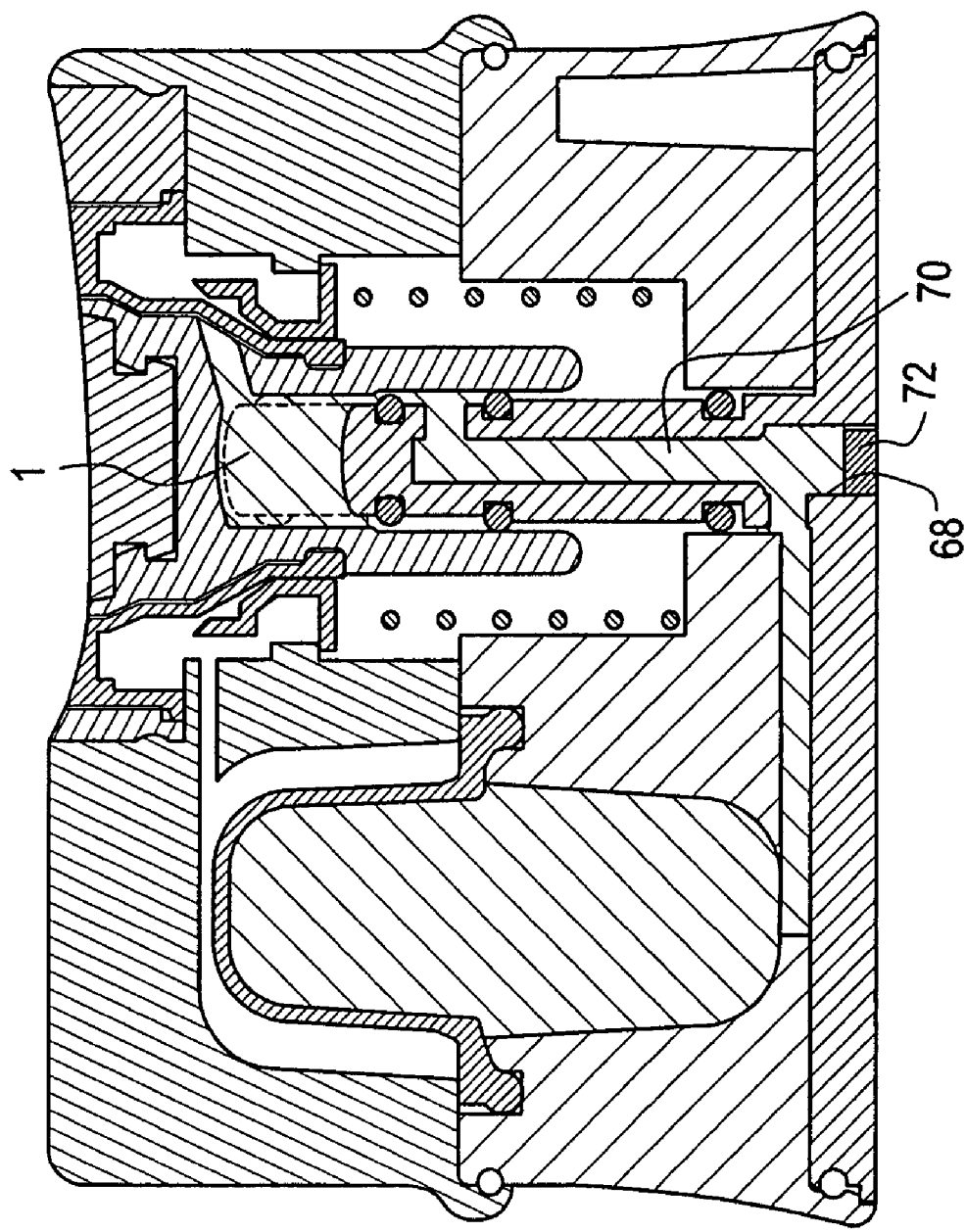
FIG. 10 is a cross-sectional view of the dispenser of FIG. 1 showing the variable-volume storage chamber filled with a substance to be dispensed.

A biasing member, such as a coil spring 24, is coupled between the one-way valve 20 and housing 12 to normally bias the valve in the direction from the second position, as shown typically in broken lines in FIG. 10, toward the second position, as shown typically in FIG. 8.

As shown in FIG. 8, the one-way valve 20 includes a valve body 26 defining the compression chamber 22 for receiving therein the piston 18, and an axially-extending valve seat 28. The valve 20 further includes an axially-extending flexible valve cover 30 seated on the valve seat 28 and defining a normally-closed, axially-extending seam 32 therebetween forming a fluid-tight seal between the valve cover 30 and valve seat 28. The valve body 26 further defines a first bore 34 for receiving the piston 18 in the first position, as shown typically in FIG. 10, and a passageway 36 between the first bore 34 and piston 18 for permitting the flow of substance therethrough from the variable-volume storage chamber 14 into the compression chamber 22, as indicated by the arrows in FIG. 8. The valve body 26 further defines an outlet aperture 38 coupled in fluid communication between the compression chamber 22 and the valve seam 32, and a second bore 40 formed between the first bore 34 and the outlet aperture 38 and defining therein the compression chamber 22. As shown typically in FIG. 8, the valve body 26 further defines an annular surface 42 that tapers radially inwardly between the first and second bores 34 and 40, respectively.

The piston 18 includes a plurality of annular sealing portions or members 43 axially spaced relative to each other on the piston and slidably contacting the valve body to form a fluid-tight seal therebetween. In the illustrated embodiment, the sealing members are formed by O-rings or like sealing members; however, as may be recognized by those of ordinary skill in the pertinent art based on the teachings herein, the sealing portions or members may take any of numerous different shapes or configurations that are currently or later become known.

As shown in FIG. 8, in the first or rest position, the upper sealing member 43 is spaced radially away from the first bore 34 to permit the flow of the cream, gel or other substance within the variable-volume storage chamber therethrough and into the compression chamber 22. The lower sealing member 43, on the other hand, always forms a fluid-tight seal between the piston and valve body to prevent the flow of any fluid downwardly and therebetween. As shown typically in broken lines in FIG. 10, when the tip of the piston 18 enters the compression chamber, the upper sealing member 43 engages the second bore 40 of the valve body and forms a fluid-tight seal therebetween. This, in turn, increases the pressure of the cream, gel or other substance within the compression chamber with further downward movement of the valve.

Then, when the pressure in the compression chamber exceeds the valve opening pressure, the cream, gel or other substance in the compression chamber flows through the seam 32 and is dispensed through the valve.

As can be seen, the axially-extending seam 32 formed between the axially-extending valve seat 28 and axially-extending flexible valve cover 30 seated thereon is normally-closed, and forms a fluid-tight seal between the valve cover 30 and valve seat 28. The outlet aperture 38 of the valve is coupled in fluid communication between the compression chamber 22 and the seam 32. As described further below, the visco-elastic valve cover 30 is movable relative to the valve seat 28 and the seam 32 is connectable in fluid communication with the outlet aperture 38 to allow the passage of substance from the compression chamber 22 through the seam and out of the dispenser. As shown typically by the overlapping lines in the cross-sectional views (FIGS. 8-10) the visco-elastic valve cover 30 forms an interference fit with the valve seat 28 to facilitate forming a fluid-tight seal.

Figure 9:
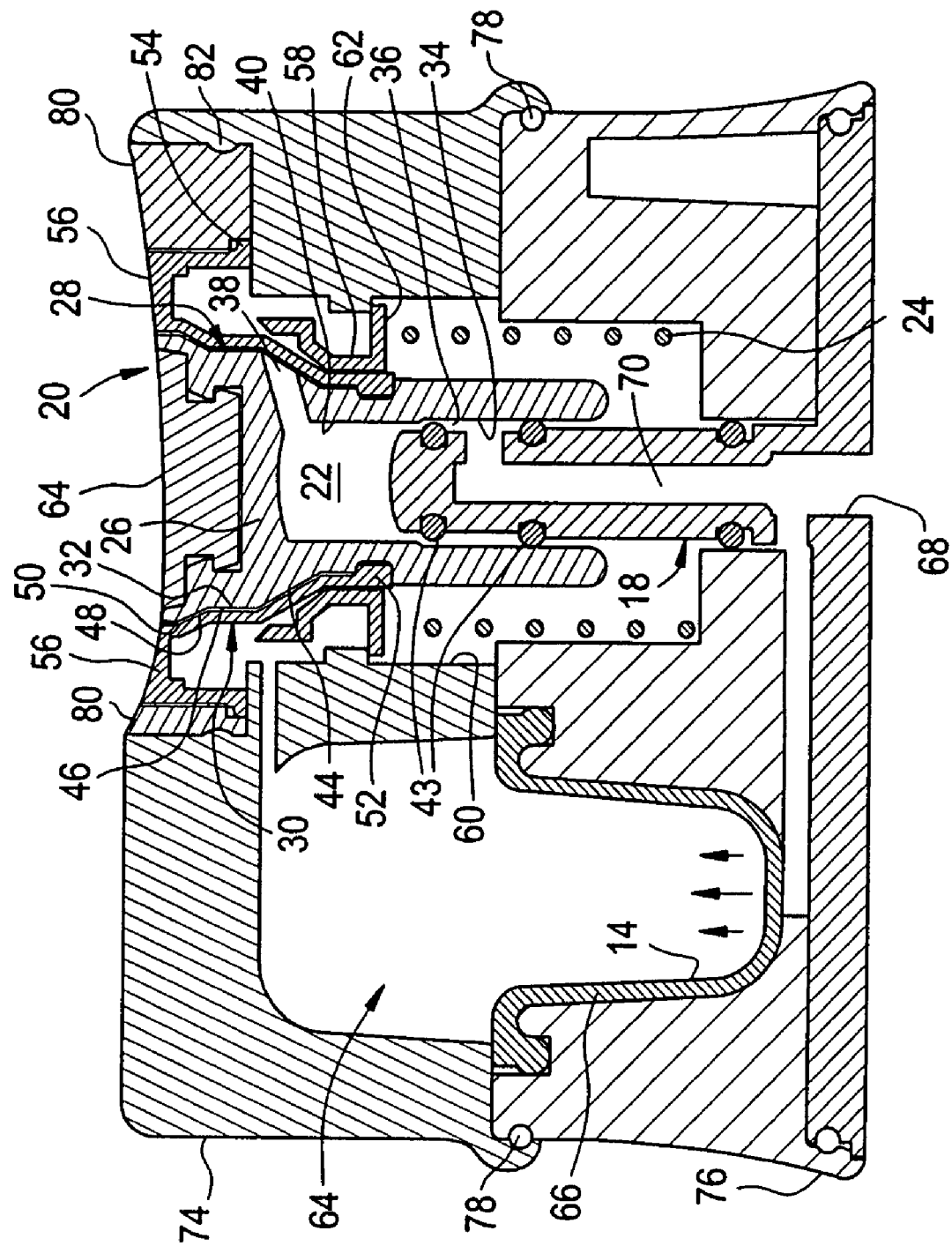
FIG. 9 is a cross-sectional view of the dispenser of FIG. 1 showing the filling of the variable-volume storage chamber.
Figure 11:
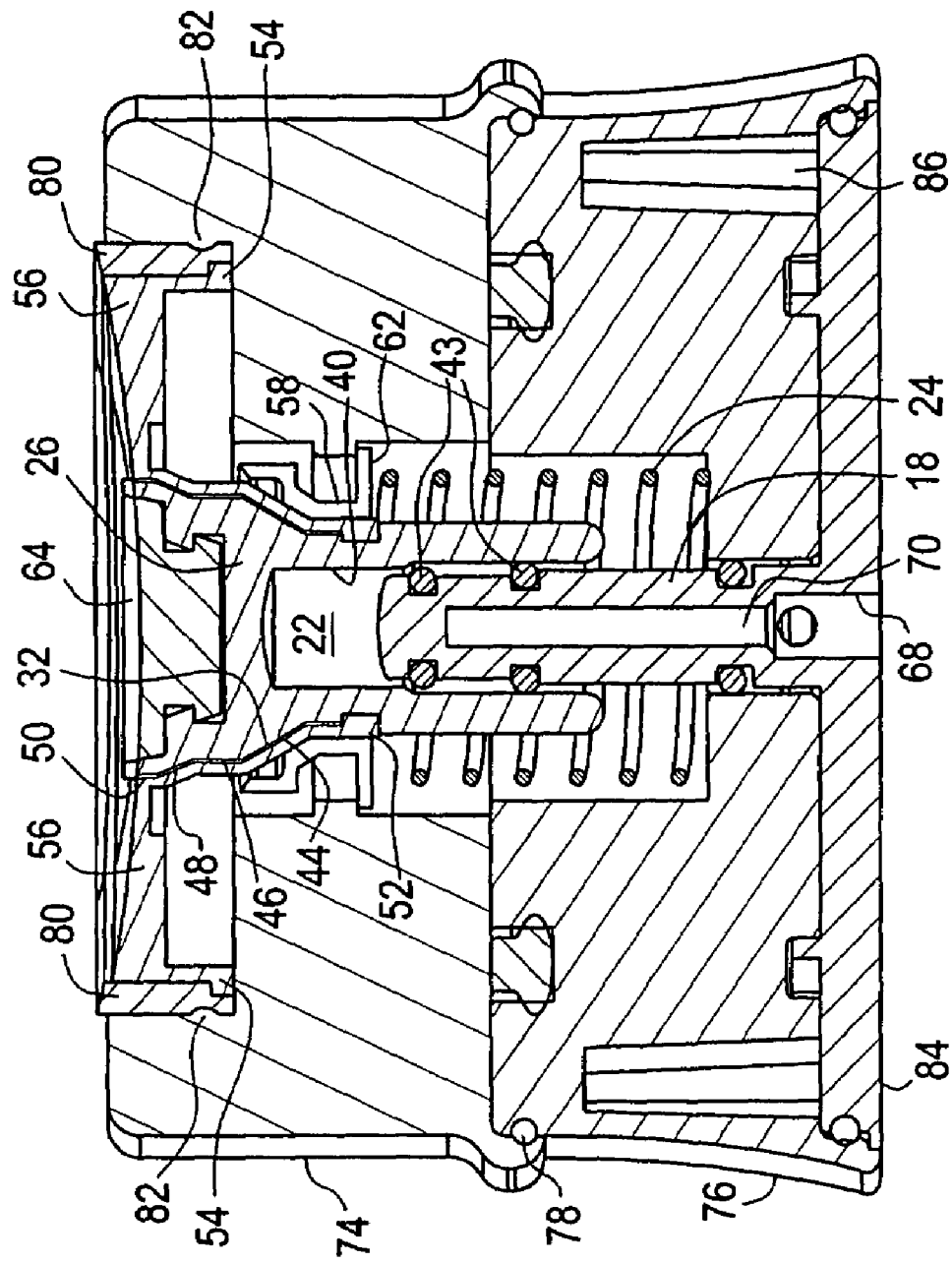
FIG. 11 is another cross-sectional view of the dispenser of FIG. 1.
Figure 12:
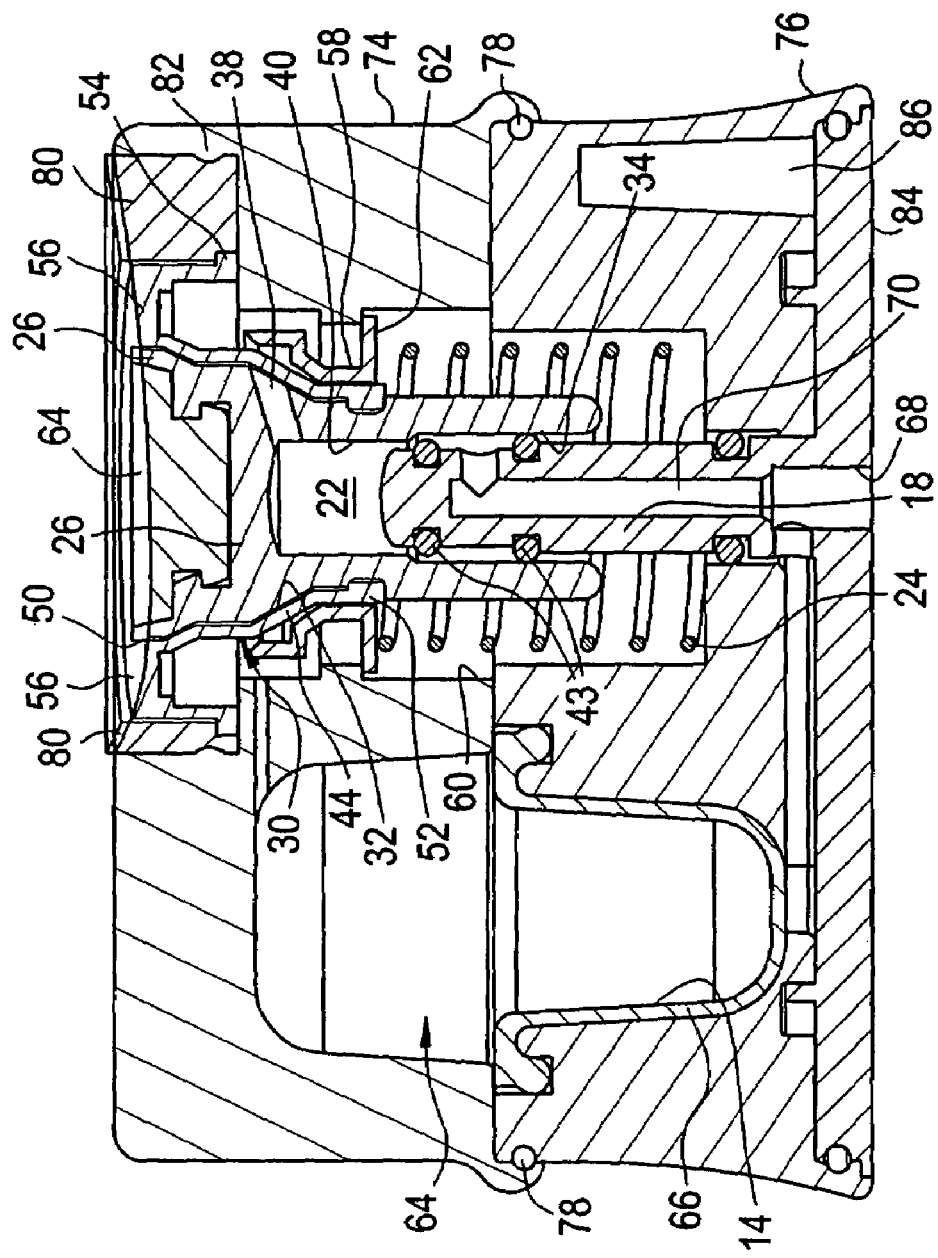
FIG. 12 is another cross-sectional view of the dispenser of FIG. 1.

In the illustrated embodiment of the present invention, the valve seat 28 defines several surface portions that taper radially outwardly in the direction from the interior to the exterior of the valve. As shown in FIGS. 9 and 11, the valve seat 28 defines a first surface segment 44 that tapers radially outwardly at a first acute angle relative to the axis of the valve; a second surface segment 46 that is contiguous to, and downstream of the first surface segment 44, and is oriented substantially parallel to the axis of the valve; a third surface segment 48 that is contiguous to, and downstream of the second surface segment 46, and that tapers radially outwardly at a second acute angle relative to the axis of the valve; and a fourth surface segment 50 that is contiguous to the third surface segment 46, and is substantially parallel to the axis of the valve.

One advantage of the tapered configuration is that it requires progressively less energy to open each respective annular portion of the valve when moving axially from the interior toward the exterior of the valve. As a result, once the base of the valve is opened, the pressure is sufficient to cause the respective axial segments of the valve cover 30 to progressively open and then close after passage of fluid therethrough when moving in the axial direction to dispense a metered dose. Also, when dispensing a metered dose, preferably a substantially annular segment of the valve cover 30 substantially always engages the valve seat 28 to maintain the fluid-tight seal across the valve 20 and thereby prevent ingress through the valve of germs, bacteria or other unwanted substances and into the storage chamber 14. If desired, the valve cover may define a tapered cross-sectional configuration to further facilitate progressive reduction in energy required to open the valve when moving in the direction from the interior to the exterior of the valve, or alternatively, the valve cover may define the tapered cross-sectional configuration, and the valve seat may not define any taper at all, or may define another surface contour not shown.

As can be seen, in the illustrated embodiment, the first and second acute angles are approximately equal to each other. Preferably, the acute angles are each within the range of about 15° to about 45°, and in the illustrated embodiment, are each about 30°. However, as may be recognized by those of ordinary skill in the pertinent art based on the teachings herein, these angles are only exemplary, and may be changes as desired or otherwise required.

In addition, the flexible valve cover 30 includes a first portion 52 connected to the valve body 26 on one side of the seam 32, and a second portion 54 connected to the housing 12 on an opposite side of the seam 32 relative to the first portion 52. A movable portion 56 of the valve cover 30 extends between the second portion 54 and the seam 32 for permitting movement of the valve and valve cover between the first and second positions and relative to the housing. The first portion 52 of the valve cover defines a raised annular protuberance that is received within a correspondence annular groove formed in the valve body 26, and the second portion 54 of the valve cover defines a raised annular protuberance received within a corresponding annular groove formed in the housing 12, to fixedly secure the ends of the valve cover to the valve body and housing, respectively.

An annular guide 58 extends about the periphery of the first portion 52 of the valve cover and forms an interference fit with the resilient valve cover to prevent relative movement of the guide and valve cover. The piston 18 and valve 20 are received within a bore 60 of the housing 12, and the guide 58 defines a radially-extending flange 62 that is engagable with the surfaces of the bore 60 to guide the movement of the valve within the bore. Also, the flange 62 engages the end of the coil spring 24 to normally bias the valve in the direction from the second toward the first position.

As described further below, the valve body 26 is manually depressible relative to the piston 18 between the first and second positions to dispense metered doses of the substance stored in the variable-volume storage chamber 14 therefrom. The valve body 26 includes a manually engagable surface 64 on the exposed side of the valve that is manually engagable and depressible to actuate the dispenser. The seam 32 extends about a peripheral portion of the manually engagable surface 64 such that the metered dosages of the substance dispensed through the seam are released onto the manually engagable surface, and can be easily wiped therefrom with the user's finger(s). As can be seen, the external surfaces of the manually engagable portion 26, movable portion 56, and adjacent portions of the housing define a smooth, concave contour, to facilitate wiping the metered, dispensed dosages of substance therefrom. Preferably, the manually engagable surface is formed of a resilient material, such as an elastomer material, to obtain a desired tactile feel; however, other desired materials may be employed. Each metered dosage is approximately equal to the volume of the compression chamber 22, and thus, the dosage volume can be precisely controlled by setting the volume of the compression chamber.

In the illustrated embodiments of the present invention, the housing and valve body are made of relatively hard plastic materials, such as any of the plastics sold under the trademarks Topaz™, Surlyn™, and Zeonex™. The piston may be made of any of the same materials, or if it is desired to form an interference fit between the piston and compression chamber without the use of the O-rings or like sealing members, the piston, or at least the tip thereof, may be made of a softer grade of hard plastic in comparison to the valve body, such as any of numerous different brands of polypropylene, or the plastic sold under the trademark Alathon™.

Figure 6:
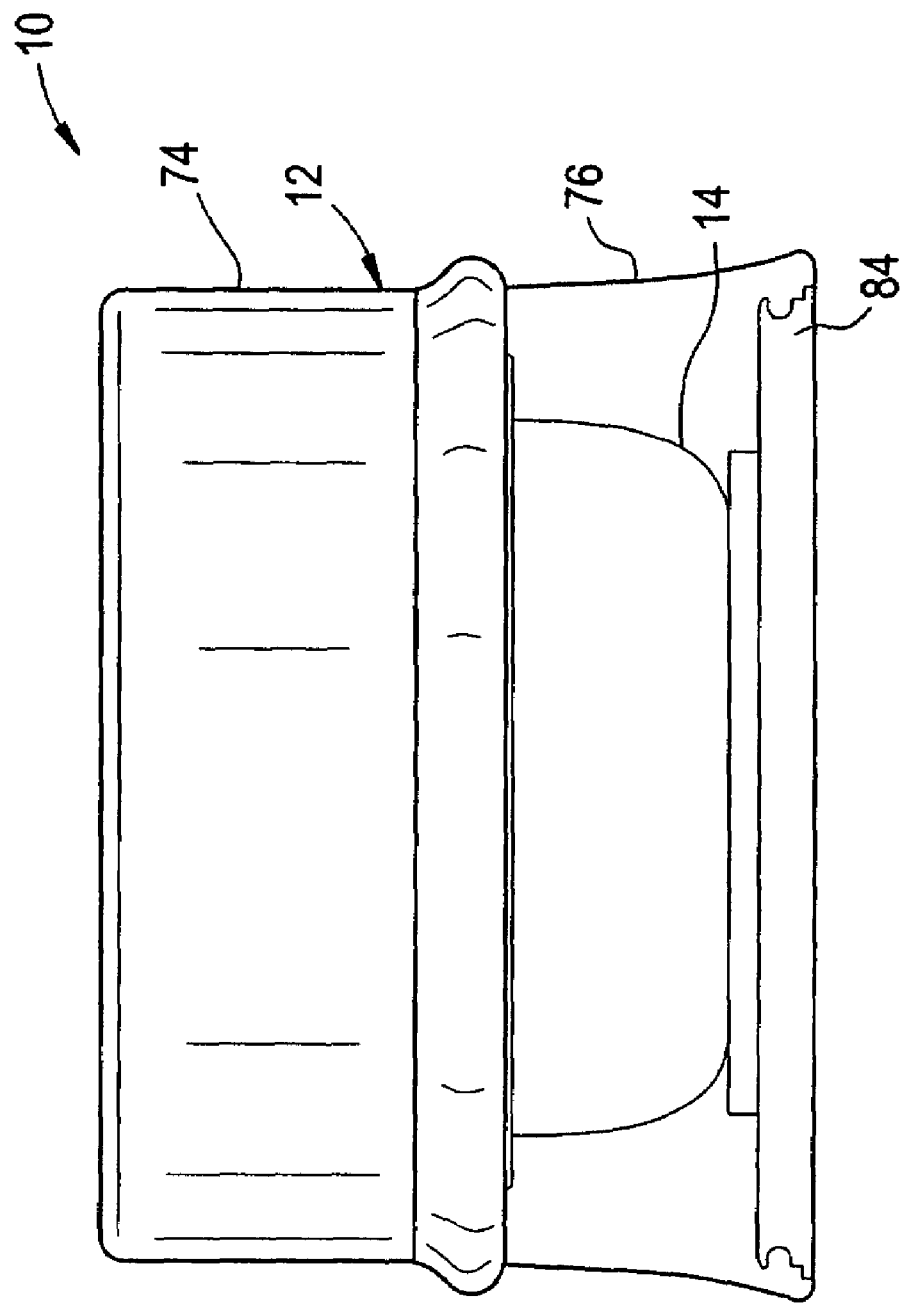
FIG. 6 is another side elevational view of the dispenser of FIG. 1.
Figure 7:
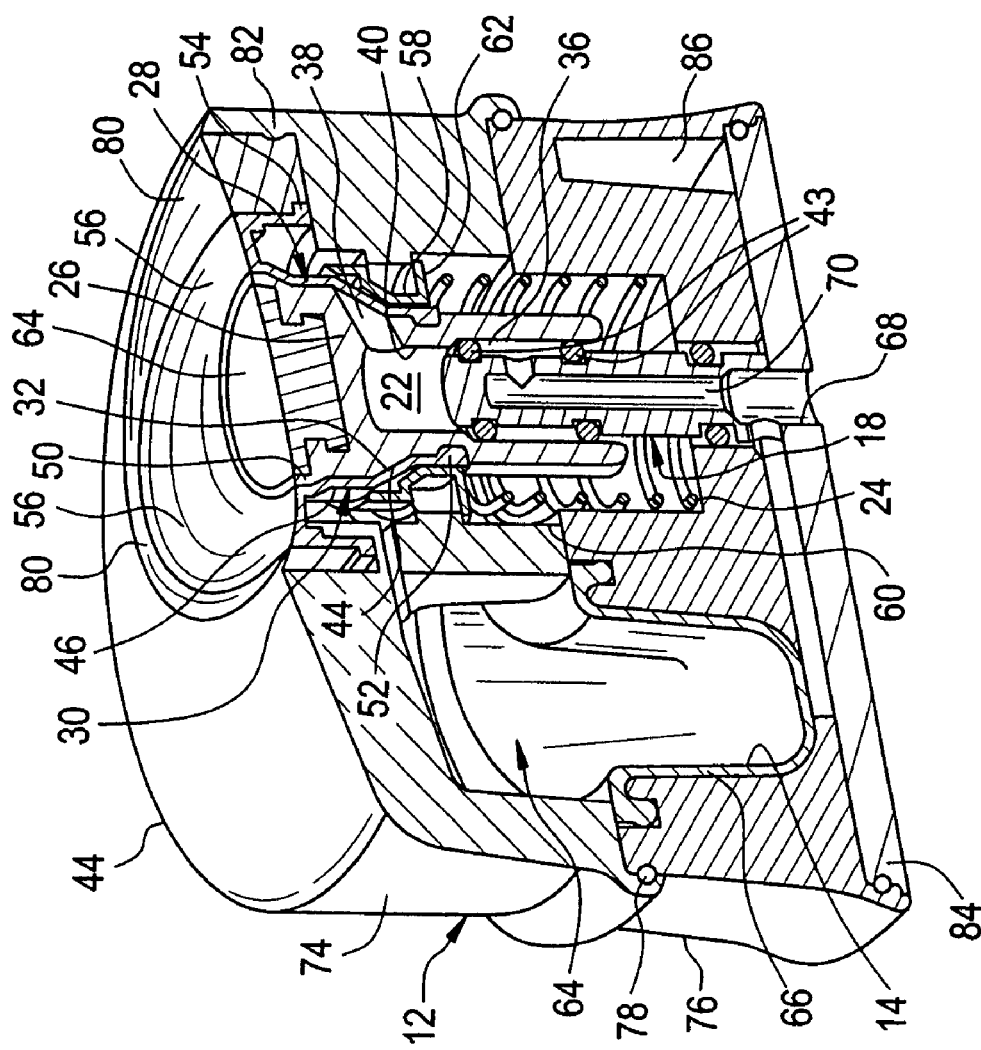
FIG. 7 is a cross-sectional, perspective view of the dispenser of FIG. 1.

As may be recognized by those of ordinary skill in the pertinent art based on the teachings herein, the illustrated shape and above-mentioned materials of construction are only exemplary, and numerous other shapes and/or materials of construction equally may be employed. For example, if desired, the piston tip may be formed of a resilient material that is attached to the end of the piston assembly. However, one advantage of an integral, relatively hard plastic piston as shown in FIG. 6, for example, is that it eliminates any such additional resilient part, thus reducing the overall cost and providing a design that reliably seals the compression zone from one dispenser to the next.

As shown in FIGS. 8-10, the outlet aperture 38 is oriented at an acute angle relative to the axis of the valve body and piston, and the outlet end of the aperture extends through the first segment 44 of the valve seat 28. The illustrated embodiment of the present invention includes a single, angular extending outlet aperture 38 for delivering the metered dosage. If desired, additional outlet apertures may be added (e.g., a second outlet aperture of the same or different size diametrically opposed to the illustrated aperture 38), or the aperture 38 may be moved to another position than the position shown (e.g., the single outlet aperture may be located on the opposite side of the valve seat than that shown). The valve cover 30 is preferably made of an elastomeric material, such as the polymeric material sold under the trademark Kraton™, or a vulcanized rubber or other polymeric material. As may be recognized by those of ordinary skill in the pertinent art based on the teachings herein, however, these materials are only exemplary, and numerous other materials that are currently or later become known for performing the function of the valve cover equally may be used.

As shown in FIGS. 8-10, the variable-volume storage chamber 14 is defined by an axially-extending chamber 64 formed within the housing 12, and a flexible bladder 66 mounted within the chamber 64. The flexible bladder 66 defines a peripheral lobe received within a correspondence groove formed in the housing 12 to form the fluid-tight seal 16. As shown in FIGS. 8-10, the flexible bladder 66 is movable axially within the chamber 64 to permit filling of the variable-volume storage chamber 14 with the substance to be dispensed, and to reduce the volume of the variable-volume storage chamber upon dispensing each metered dose in an amount approximately equal to the volume of the dose dispensed. The housing 12 defines a filling port 68 in the base wall thereof, and the piston 18 defines a conduit 70 extending in fluid communication between the variable-volume storage chamber 14 and the passageway 36 and compression chamber 22.

The dispenser 10 is filled by slidably receiving a probe (not shown) within the filling port 68. Then, as indicated by the arrows in FIG. 9, fluid, such as a liquid, cream, gel, or other cosmetic or cosmeceutical product, for example, is introduced through the probe, through the conduit 70, and into the storage chamber 14. As the storage chamber 14 is filled with fluid, the bladder 66 correspondingly moves upwardly (or axially) within the chamber 64 of the housing to allow the variable volume chamber 14 to correspondingly expand and receive the fluid. Once the storage chamber 14 is filled, the probe is removed from the filling port 68, and the filling port is sealed with a plug 72 (FIG. 10) to hermetically seal the fluid within the dispenser.

The bladder 66 is preferably made of an elastomeric material, such as one of the polymeric materials sold under the trademarks Kraton™ or Santoprene™ (e.g., Santoprene 8211-35), or a vulcanized rubber or other polymeric material. However, as may be recognized by those of ordinary skill in the pertinent art based on the teachings herein, these materials are only exemplary, and numerous other materials that are currently, or later become known for performing the functions of the bladder and/or valve member equally may be used.

As shown in FIG. 8, when the dispenser is empty, the bladder 66 is drawn down fully into engagement with the base wall of the chamber 64 of the housing such that the variable volume storage chamber 14 is at substantially zero volume. If desired, the bladder 66 may be formed such that it creates a positive pressure gradient on the fluid or other substance in the storage chamber 14.

If desired, rather than simply include the filling port 68 and plug 72, the dispenser may include a second one-way valve or filling valve (not shown) mounted within the filling port for receiving the substance therethrough to fill the variable-volume storage chamber 14, and to retain the substance within the storage chamber in a hermetically sealed, substantially airless condition. In this embodiment, the second one-way valve may include an axially-extending valve seat and an axially-extending flexible valve cover seated on the valve seat and defining a normally-closed, axially-extending seam therebetween forming a fluid-tight seal between the valve cover and valve seat. The flexible valve cover is movable relative to the valve seat and the seam is connectable in fluid communication with variable-volume storage chamber to permit the passage of substance through the seam and into the storage chamber. This type of valve may be filled in substantially the same manner as described above by connecting the filling probe to the valve and pumping the substance through the valve and into the storage chamber. The valve cover of the filling valve is normally closed to maintain the interior of the dispenser hermetically sealed. Thus, prior to filling, the empty dispenser may be sterilized, such as by applying gamma, e-beam, or another type of radiation thereto. Then, the sealed, empty and sterilized dispenser may be transported to a sterile filling machine or other filling station without risk of contaminating the sterilized interior portions of the dispenser.

The housing 12 includes a first or upper housing part 74 and a second or base housing part 76 fixedly secured to the first housing part and forming a fluid-tight seal therebetween. A peripheral sealing member 78, such as an o-ring or like sealing member, is compressed between the first and second housing parts to form the fluid-tight seal therebetween. As also shown in FIGS. 8-10, the sealing portion 16 of the flexible bladder 66 is compressed between the first and second housing parts to form a fluid-tight seal between the variable volume storage chamber and the ambient atmosphere.

The housing further includes an annular fastening member 80 extending about the periphery of the second portion 54 of the valve cover to fixedly secure the valve cover to the housing and form a fluid-tight seal therebetween. The fastening member 80 includes a peripheral recess, and the adjacent surfaces of the housing define an annular lobe that is received within the recess to fixedly secure the fastening member to the housing. As shown in the drawings, the external surfaces of the fastening member 80, valve body 26 and manually engagable portion 64 thereof, and surrounding surface of the upper housing part 74 cooperate to define a substantially smooth, generally concave surface contour for receiving the metered dosages of substance dispensed through the valve, and permitting convenient removal therefrom by a user.

The base housing part 76 includes a base wall 84 fixedly secured thereto, and including an annular sealing member 86, such as an o-ring, therebetween to form a fluid-tight seal. As can be seen, the base wall 84 defines the filling port 68, and cooperates with the base 76 to form the conduit 70 extending from the variable-volume storage chamber 14 and through the piston 18. An axially and angularly-extending chamber 86 is formed in the base housing part 76 adjacent to the outer surface thereof. In some embodiments of the present invention, the base housing part is transparent or translucent, and the chamber 86 is adapted to receive a label or like member for identifying the substance within the dispenser or otherwise providing desired information.

In the operation of the dispenser 10, the user manually depresses the engagable portion 64 of the valve 20. This, in turn, moves the valve from the first position shown in FIGS.

8-10, to the second position, shown in broken lines in FIG. 10. Movement of the valve 20 between the first and second positions pressurizes the cream, gel or other fluid in the compression chamber until the pressure within the compression chamber reaches the valve opening pressure. Then, a metered dosage substantially equal to the volume of the compression chamber is dispensed through the outlet aperture 38 and seam 32 and out of the dispenser. The metered dosage is delivered to the contoured surfaces on the exterior side of the valve, and the user can wipe away the dosage with one or more fingers. When the user releases the manually engagable portion 64 of the valve, the spring 24 drives the valve from the second position, as shown in broken lines in FIG. 10, to the first position, as shown in FIG. 8. The movement of the valve body 26 away from the piston 18 draws by suction (the sealed chambers 14 and 22, and conduits therebetween, are preferably airless or substantially airless) another dosage of the cream, gel or other substance from the variable-volume storage chamber 14 and/or conduit 70, and into the compression chamber 22 to fill the compression chamber. The flexible bladder 66 substantially simultaneously moves downwardly within the chamber 64 of the housing to reduce the volume of the variable-volume storage chamber 14 by an amount approximately equal to the amount of the next dose delivered to the compression chamber 22. The dispenser is then ready to deliver another dose.

As may be recognized by those of ordinary skill in the pertinent art based on the teachings herein, the spring 24 may take any of numerous different shapes and/or configurations, or may be formed of any of numerous different materials, that are currently, or later become known for performing the function of the spring as described herein. For example, the spring may be formed of an elastic material and may define a dome or other shape. The dome-shaped or other elastomeric spring may be located in the same position as the spring 24 (i.e., extending between the base of the valve body and housing). Alternatively, such an elastomeric spring may be formed integral with the valve cover in the region of the movable portion 56 of the valve cover, for example. Thus, the spring may take the form of any of numerous different springs that are currently or later become known, and may be made of metal, plastic, or any of numerous other materials, for biasing at least one of the piston and valve relative to the other, as described herein. Also, the shape and/or material of construction of the spring may be selected to control the spring force. One advantage of the substantially dome-shaped configuration, is that the dome shape imparts lateral (or radial) and axial forces to the valve to facilitate maintaining sufficient force to drive the valve from the fully-depressed to the rest position throughout the shelf-life and usage of the dispenser 10. Yet another advantage of an elastomeric spring is that it may be formed integral with the valve cover, and therefore eliminate the need for an additional part.

One advantage of the currently preferred embodiments of the present invention, is that once a metered dosage is dispensed, the valve 20 returns to its rest position, as shown typically in FIG. 8, and thus substantially equalizes the pressure in the compression chamber 22 and the storage chamber 14. As a result, the cream, gel or other substance does not continue to flow through the valve. Thus, residual seepage of cream, gel or other substance through the dispensing valve may be avoided. Yet another advantage of the dispenser of the present invention, is that the bulk of the cream, gel or other substance stored within the variable-volume storage chamber 14 remains hermetically sealed in the storage chamber throughout the shelf life and usage of the dispenser. Yet another advantage of the dispensers of the present invention is that the variable-volume storage chamber may be maintained in an airless, or substantially airless condition, and the one-way valve substantially prevents any germs, bacteria or other unwanted substances from entered the dispenser and contaminating the bulk of the cream, gel or other substance or product contained within the dispenser. Accordingly, if desired, the dispensers of the present invention may be used to store and dispense multiple doses of sterile substances and/or preservative-free substances.

Figure 13:
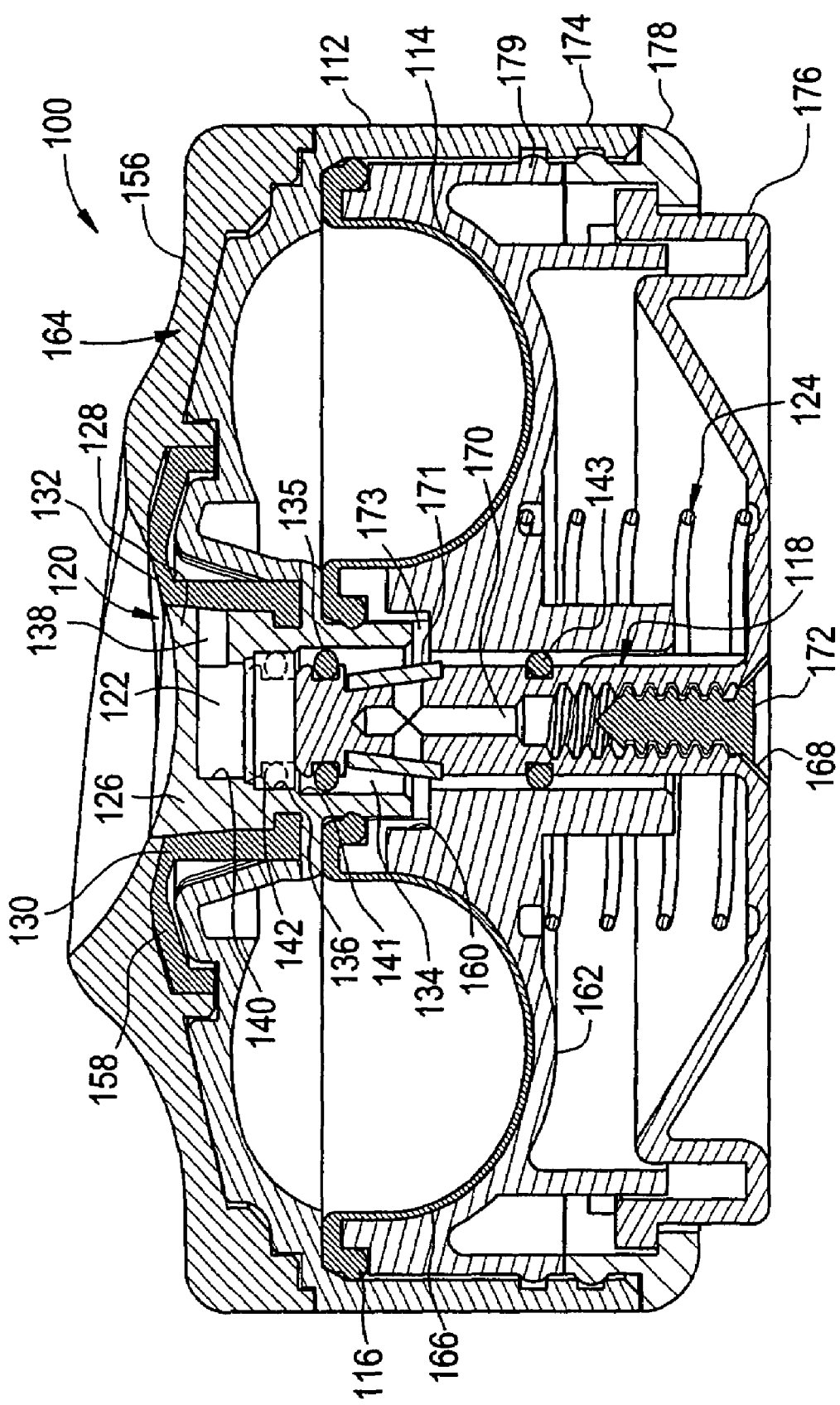
FIG. 13 is a cross-sectional view of an alternative embodiment of the dispenser in the active position.
Figure 14:
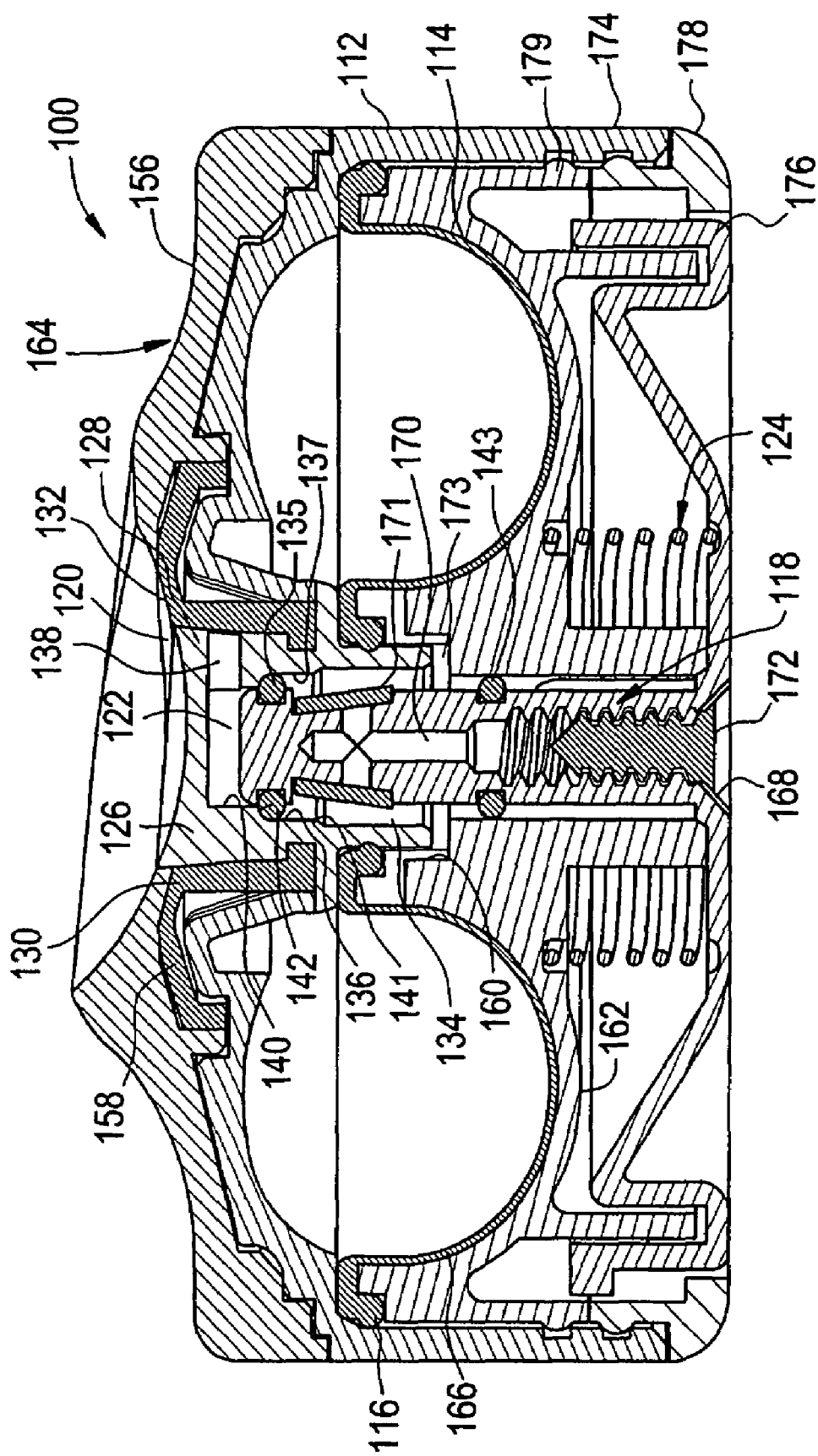
FIG. 14 is another cross-sectional view of the dispenser of FIG. 13 in the filling position.

In FIGS. 13 and 14, another embodiment of a dispenser of the present invention is indicated generally by the reference numeral 100. The dispenser 100 is similar to the dispenser 10 described above with reference to FIGS. 1-12, and therefore like reference numeral preceded by the numeral 1 are used to indicate like elements. FIG. 13 depicts the dispenser 100 in the active or ready position. FIG. 14 depicts the dispenser in the filling or dispensing position. One primary difference of the dispenser 100 in comparison to the dispenser 10 described above with reference to FIGS. 1-12 is that the manually engagable surface 164 is positioned around the periphery of the one-way valve 120 as opposed to within the one-way valve. This permits a larger movable portion 156 on the upper region of the dispenser 100 for actuating the one-way valve 120 with respect to the previously described embodiment (FIG. 1-12) and to thereby facilitate dispensing.

A second difference of the dispenser 100 in comparison to the dispenser 10 is that the variable-volume storage chamber 114 holding the bladder 166 is annular in shape as opposed to non-annular 14.

A third difference of the dispenser 100 in comparison to the dispenser 10 is that the substance passageway leading to the compression chamber 122 comprises three bores (134, 136 and 140) of differing diameters as opposed to two bores (34, 40). It is noted that additional bores may also be included. When additional bores are included, the substance may be dispensed from the variable volume storage chamber in a more even manner.

A fourth difference of the dispenser 100 in comparison to the dispenser 10 is that the axially extending seam 132 is not comprised of tapered surface segments (44, 46, and 48) as in dispenser 10.

A fifth difference of the dispenser 100 is that the fill system comprises an annular one-way flexible fill valve 171 for permitting entry of the substance into the variable-volume storage chamber 114. A fill tube (not shown) is positioned in the fill port 168 and exerts a positive pressure by the passage of substance through the upstream fill conduit 170 and into the one-way flexible fill valve 171. The positive pressure opens the one-way flexible fill valve 171 such that substance passes into the downstream fill conduit 173. The substance then fills the area around the flexible bladder 166 in the variable volume storage container 114. During the filling process, positive pressure develops in the variable volume storage chamber 114 from the substance pressing against the flexible bladder 166. As the flexible bladder 166 moves upwardly and compresses air in the variable volume storage chamber 114, it does not conform to the upper surface of the chamber 114, but rather air pocket(s) are created above the substance in the chamber, which facilitates in dispensing the substance upon actuation of one-way valve 120. Once positive pressure created by the substance passing through the fill tube (not shown) subsides, the one-way flexible fill valve 171 closes, which prevents the backflow of substance from the variable-volume dispensing chamber 114 into the filling port 168. Annular sealing members 143 serve to prevent the flow of substance from the variable volume dispensing chamber and the compression chamber down the bores (134, 136, 140) of the one-way valve 120.

The filling valve 171 may be the same as, or similar to any of the filling valves disclosed in, and the filling apparatus and method of filling the dispenser may be the same as or similar to any of the apparatus or methods disclosed in, the following co-pending patent application which is assigned to the Assignee of the present invention and is hereby expressly incorporated by reference as part of the present disclosure: U.S. application Ser. No. 10/843,902, filed May 12, 2004, titled "Dispenser and Apparatus and Method for Filling a Dispenser".

Figure 15:
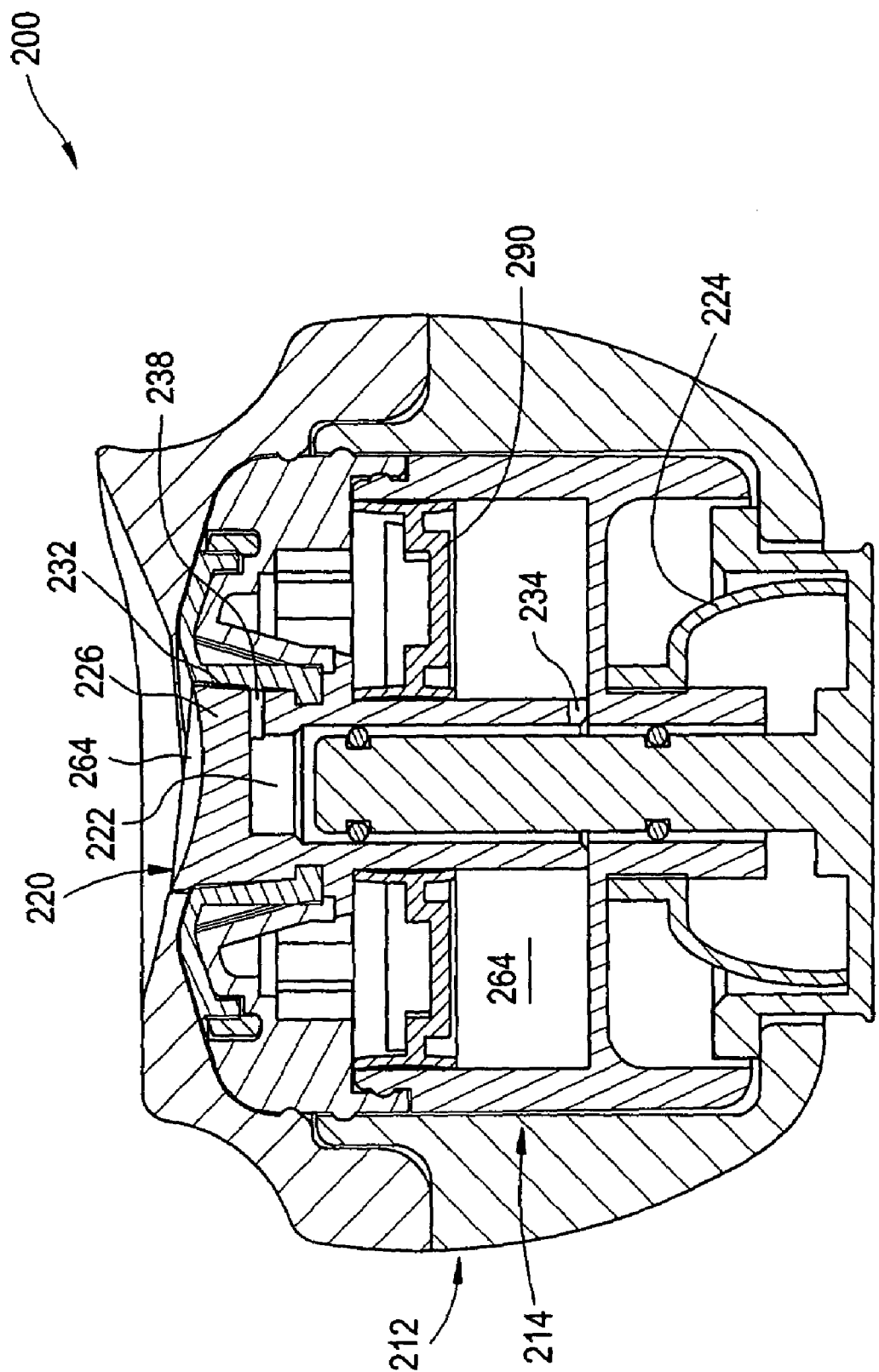
FIG. 15 is an alternative embodiment of the dispenser showing the variable volume storage chamber having a slidable wall.

Referring to FIG. 15, another embodiment of a dispenser of the present invention is indicated generally by reference number 200. The dispenser 200 is similar to the dispensers 10 and 100 described above with reference to FIGS. 1-14, and therefore like reference numerals preceded by the numeral 2 are used to indicate like elements. FIG. 15 illustrates the variable-storage chamber 214 as being a slidable wall 290 or plunger received within the chamber 264 of the housing 212 (or a chamber defining a different form to receive the plunger) and forming a substantially fluid-tight seal therebetween. The slidable wall 290 replaces the flexible bladder and operates in a similar manner as the flexible bladder. The slidable wall 290 is movable axially (in a downward direction as shown in the figure) upon dispensing a dosage from the storage chamber to reduce the volume of the storage chamber in an amount approximately equal to the volume of the dose dispensed.

In the operation of the dispenser 210, the user manually depresses the engagable portion 264 of the valve 220. Movement of the valve 220 in a downward direction, as shown in the figure, pressurizes the cream, gel or other fluid in the compression chamber until the pressure within the compression chamber reaches the valve opening pressure. Then, a metered dosage substantially equal to the volume of the compression chamber is dispensed through the outlet aperture 238 and seam 232 and out of the dispenser. The metered dosage is delivered to the contoured surfaces on the exterior side of the valve, and the user can wipe away the dosage with one or more fingers.

When the user releases the manually engagable portion 264 of the valve, the spring 224, which illustrated as a dome spring in this embodiment, drives the valve in an upward direction. The movement of the valve body 226 away from the piston 218 draws by suction another dosage of the cream, gel or other substance from the variable-volume storage chamber 214 and/or conduit 270, and into the compression chamber 22 to fill the compression chamber. The slidable wall 290 substantially simultaneously moves downwardly within the chamber 264 of the housing to reduce the volume of the variable-volume storage chamber 214 by an amount approximately equal to the amount of the next dose delivered to the compression chamber 222. The dispenser is then ready to deliver another dose.

The slidable wall 290 may be made of a relatively resilient plastic material, such as one of the plastics sold under the trademark Santoprene™ (e.g., Santoprene 8211-35 (shore 35 hardness) or 8211-55 (shore 55 hardness)). As indicated above, the valve cover and dome spring (if employed as described above) also may be made of a relatively resilient plastic, such as one of the plastics sold under the trademark Santoprene™ (e.g., Santoprene 8211-35 (shore 35 hardness)). As may be recognized by those of ordinary skill in the pertinent art based on the teachings herein, these materials are only exemplary, and may be changed as desired or otherwise required by a particular application. For example, in applications requiring low sorption, the slidable wall, piston, housing, and/or valve body may be formed of a relatively low sorptive material, such as a relatively hard plastic, including one or more of the plastics sold under the trademark Topas.

This patent application includes subject matter that is similar or relevant to the subject matter disclosed in co-pending U.S. patent application Ser. No. 10/272,577, filed Oct. 16, 2002, entitled "Dispenser With Sealed Chamber And One-Way Valve For Providing Metered Amounts Of Substances", U.S. patent application Ser. No. 10/843,902, filed May 12, 2004, entitled "Dispenser And Apparatus And Method For Filling A Dispenser", U.S. patent application Ser. No. 10/893,686, filed Jul. 16, 2004, entitled "Piston-Type Dispenser With One-Way Valve For Storing And Dispensing Metered Amounts Of Substances", and U.S. design patent application Ser. No. 29/214,038 filed on Sep. 27, 2004 entitled "Dispensing Container", each of which is assigned to the Assignee of the present invention and is hereby expressly incorporated by reference as part of the present disclosure.

As may be recognized by those of ordinary skill in the pertinent art based on the teachings herein, numerous changes and modifications may be made to the above-described and other embodiments of the present invention without departing from the spirit of the invention as defined in the claims. For example, the components of the dispensers may be made of any of numerous different materials that are currently or later become known for performing the function(s) of each such component. Similarly, the components of the dispensers may take any of numerous different shapes and/or configurations. Also, the dispensers may be used to dispense any of numerous different types of fluids or other substances for any of numerous different applications, including, for example, cosmetic, dermatological, or other pharmaceutical, cosmeceutical and/or OTC applications. Further, the filling machine used to fill the dispensers of the present invention may take any of numerous different configurations that are currently, or later become known for filling the dispensers. For example, the filling machines may have any of numerous different mechanisms for sterilizing, feeding, evacuating and/or filling the dispensers. Further, if a filling valve is employed, it could take any of numerous different configurations, and could be located in any of numerous different locations, including, for example, a filling valve that extends through a housing wall or otherwise is coupled in fluid communication with the storage chamber to evacuate and/or fill the storage chamber. Alternatively, the dispenser may include one valve for evacuating the interior of the dispenser and another valve for filling the storage chamber of the dispenser. Still further, the piston and/or dispensing valve each may take a configuration that is different than that disclosed herein. Accordingly, this detailed description of currently preferred embodiments is to be taken in an illustrative, as opposed to a limiting sense.

What is claimed is:

1. A dispenser comprising:

a housing;

a variable-volume storage chamber located within the housing and defining a substantially fluid-tight seal between the chamber and exterior of the housing for storing a substance to be dispensed;

a manually engageable surface mounted on the housing that is manually engageable and depressible to actuate the dispenser, wherein the manually engageable surface is manually depressible between first and second positions and is normally biased in a direction from the second position toward the first position;

a one-way valve mounted on the housing and connectible in fluid communication with the variable-volume storage chamber, wherein the one-way valve includes an elastic arcuate-shaped valve member, and a relatively rigid arcuate-shaped valve seat, wherein the valve member and valve seat form an interference fit defining a normally closed arcuate, axially-extending outlet forming a fluid-tight seal that prevents a flow of the substance therethrough but that allows the substance within the valve to flow therethrough when the substance exceeds a valve opening pressure;

a compression chamber connectible in fluid communication between the variable volume storage chamber and the one-way valve, wherein (i) during movement of the manually engageable surface in the direction from the second position toward the first position, the variable-volume storage chamber is in fluid communication with the compression chamber for permitting the substance to flow from the variable-volume storage chamber into the compression chamber, and (ii) during movement of the manually engageable surface in a direction from the first position toward the second position, the compression chamber is not in fluid communication with the variable-volume storage chamber and the substance within the compression chamber is pressurized above the valve opening pressuring and, in turn, dispensed through the normally closed outlet of the one-way valve assembly and out of the dispenser.

2. A dispenser as defined in claim 1, further comprising:

a piston mounted within the housing, wherein in the first position the piston is located at least partially outside of the compression chamber, and in the second position the piston is located at least partially within the compression chamber; and a biasing member for biasing at least one of the piston and valve in the direction from the second position toward the first position.

3. A dispenser as defined in claim 1, further comprising a biasing member for biasing the manually engageable surface in the direction from the second position toward the first position, wherein the biasing member is at least one of a coil spring and a resilient, elastomeric spring.

4. A dispenser as defined in claim 3, wherein the resilient, elastomeric spring is approximately dome shaped.

5. A dispenser as defined in claim 1, wherein the axially-extending valve member and the valve seat define a normally-closed, axially-extending seam therebetween forming a fluid-tight seal between the valve member and valve seat, and the one-way valve defines at least one outlet aperture coupled in fluid communication between the compression chamber and the seam, wherein the valve member is movable relative to the valve seat and the seam is connectable in fluid communication with the outlet aperture to allow the flow of the substance from the compression chamber through the seam and out of the dispenser.

6. A dispenser as defined in claim 5, wherein the valve member is responsive to the flow of the substance in the outlet aperture exceeding the valve opening pressure to move between (i) a normally-closed condition, and (ii) an open condition wherein portions of the valve member axially spaced relative to each other substantially sequentially move substantially radially relative to the valve seat to allow the flow of the substance through the seam and out of the dispenser.

7. A dispenser as defined in claim 1, further comprising one of (i) a flexible bladder mounted within the housing and defining the variable-volume storage chamber, and (ii) a slidable wall mounted within the housing and defining the variable-volume storage chamber between the slidable wall and the housing.

8. A dispenser as defined in claim 1, further comprising a piston mounted within the housing, wherein in the first position the piston is located at least partially outside of the compression chamber, and in the second position the piston is located at least partially within the compression chamber, wherein the piston is fixed relative to the valve, and the valve is manually depressible with the manually engageable surface relative to the piston between the first and second positions.

9. A dispenser as defined in claim 2, wherein the valve includes a valve body defining the compression chamber for receiving therein the piston, an axially-extending valve seat, and an axially-extending flexible valve member seated on the valve seat and defining a normally-closed, axially-extending seam between the valve member and valve seat, and wherein the valve body defines a first bore for receiving the piston in the second position, and a passageway between the first bore and piston for permitting the flow of the substance therethrough from the variable-volume storage chamber into the compression chamber.

10. A dispenser as defined in claim 9, wherein the valve body further defines at least one outlet aperture coupled in fluid communication between the compression chamber and the seam, and a second bore formed between the first bore and the outlet aperture and defining therein the compression chamber.

11. A dispenser as defined in claim 10, wherein the valve body further defines an annular surface that tapers radially inwardly between the first and second bores.

12. A dispenser as defined in claim 6, wherein the flexible valve member includes a first portion connected to the valve body on one side of the seam, and a second portion connected to the housing on an opposite side of the seam relative to the first portion, and a movable portion extending between the second portion and the seam for permitting movement of the manually engageable surface between the first and second positions.

13. A dispenser as defined in claim 1, wherein the outlet of the one-way valve is defined by a seam that extends about a peripheral portion of the manually engageable surface and the substance is dispensed therethrough onto the manually engageable surface.

14. A dispenser as defined in claim 1, further comprising a guide extending between the valve and housing for guiding movement of the manually engageable surface between the first and second positions, and a spring coupled between the guide and housing for biasing the valve in the direction from the second position toward the first position.

15. A dispenser as defined in claim 2, wherein the valve and piston are axially aligned, and the variable-volume storage chamber is spaced radially relative to the valve and piston.

16. A dispenser as defined in claim 1, wherein the variable-volume storage chamber is substantially airless.

17. A dispenser as defined in claim 1, further comprising a plunger received within the housing and forming a substantially fluid-tight seal therebetween, wherein the plunger is movable axially upon dispensing a volume of dosage from the storage chamber to reduce the volume of the storage chamber in an amount approximately equal to the volume of the dosage dispensed.

18. A dispenser as defined in claim 1, further comprising a filling port mounted on the housing, and a second one-way valve coupled in fluid communication between the filling port and the variable volume storage chamber for filling the storage chamber therethrough.

19. A dispenser as defined in claim 18, wherein the second one-way valve includes an axially-extending valve seat and an axially-extending flexible valve member seated on the valve seat and defining a normally-closed, axially-extending seam therebetween forming a fluid-tight seal between the valve member and valve seat, and the flexible valve member is movable relative to the valve seat and the seam is connectable in fluid communication with variable-volume storage chamber to permit the passage of substance through the seam and into the storage chamber.

20. A dispenser as defined in claim 5, wherein the valve seat defines at least one tapered portion that tapers radially outwardly in a direction from an interior to an exterior of the valve, and the flexible valve member forms an interference fit with the valve seat.

21. A dispenser as defined in claim 1, wherein the outlet of the one-way valve is adjacent to the manually engageable surface and the substance is dispensed therethrough onto the manually engageable surface.

22. A dispenser comprising:
    a housing;
    a variable-volume storage chamber for receiving and storing a substance;
    manually engageable surface for actuating the dispenser that is mounted on the housing, is manually depressible between first and second positions, and is normally biased in a direction from the second position toward the first position;
    one-way valve for dispensing the substance and preventing the substance from flowing therethrough in an opposite direction, wherein the one-way valve is connectible in fluid communication with the variable-volume storage chamber, and defines an arcuate, axially-extending shape for elastically forming a normally closed outlet for preventing a flow of the substance therethrough but allowing the substance within the one-way valve to flow therethrough when the substance exceeds a valve opening pressure; and
    for receiving a portion of the substance stored in the variable-volume storage chamber and pressurizing the substance, wherein the means is connectible in fluid communication between the variable-volume storage chamber and the one-way valve, and (i) during movement of the manually engageable surface in the direction from the second position toward the first position, the variable-volume storage chamber is in fluid communication with the means for permitting the substance to flow from the variable-volume storage chamber into the means, and (ii) during movement of the manually engageable surface in a direction from the first position toward the second position, the means is not in fluid communication with the variable-volume storage chamber and the substance within the means is pressurized above the valve opening pressure of the one-way valve and, in turn, dispensed through the one-way valve and out of the dispenser.

23. A dispenser as defined in claim 22 wherein the means is a compression chamber connectible in fluid communication between the variable volume storage chamber and the one-way valve, wherein (i) during movement of the manually engageable surface in the direction from the second position toward the first position, the variable-volume storage chamber is in fluid communication with the compression chamber for permitting the substance to flow from the variable-volume storage chamber into the compression chamber, and (ii) during movement of the manually engageable surface in the direction from the first position toward the second position, the compression chamber is not in fluid communication with the variable-volume storage chamber and the substance within the compression chamber is pressurized above the valve opening pressuring and, in turn, dispensed through the normally closed outlet of the one-way valve assembly and out of the dispenser.

24. A method for storing and dispensing a sterile liquid product comprising the following steps:
    (i) maintaining a sterile liquid product hermetically sealed within a variable-volume storage chamber received within a housing of a dispenser and defining a substantially fluid-tight seal between the chamber and exterior of the housing;
    (ii) manually engaging a manually engageable surface mounted on the housing and depressing the manually engageable surface between a first position and a second position;
    (iii) during movement of the manually engageable surface in a direction from the first position toward the second position, pressurizing the sterile liquid product within a compression chamber of the dispenser above a valve opening pressure, and in turn dispensing the pressurized sterile liquid product through a normally closed arcuate, axially-extending outlet of a one-way valve mounted on the housing and out of the dispenser, wherein the one-way valve includes an elastic arcuate-shaped valve member, and a relatively rigid arcuate-shaped valve seat forming an interference fit and fluid-tight seal therebetween;
    (iv) allowing a biasing element to move the manually engageable surface in a direction from the second position toward the first position;
    (v) during movement of the manually engageable surface in the direction from the second position toward the first position, drawing fluid from the variable-volume storage chamber into the compression chamber;
    (vi) dispensing a plurality of different portions of the sterile liquid product at different points in time from the variable-volume storage chamber through the one-way valve by repeating steps (ii) through (v); and
    (vii) maintaining the sterile liquid product within the variable-volume storage chamber sterile and hermetically sealed with respect to ambient atmosphere throughout steps (i) through (vi).

25. A method as defined in claim 24, further comprising step of substantially preventing ingress of air or other contaminants through the one-way valve and into the variable-volume storage chamber during steps (i) through (vii).

26. A method as defined in claim 24, further comprising maintaining throughout step (iii) different substantially annular segments of the valve member in engagement with the valve seat to maintain the fluid-tight seal across the one-way valve and prevent ingress through the one-way valve of germs, bacteria or other unwanted substances and into the variable-volume storage chamber.

27. A method as defined in claim 24, further comprising the step of maintaining the variable-volume storage chamber substantially airless throughout steps (i) through (vii).

28. A method as defined in claim 24, further comprising the following steps: sterile filling the variable-volume storage chamber with the sterile liquid product; and hermetically sealing the sterile liquid product within the variable-volume storage chamber.

29. A method as defined in claim 28, further comprising the step of sterilizing the sterile liquid product prior to the step of sterile filling the variable-volume storage chamber with the sterile liquid product.

30. A method as defined in claim 24, wherein the sterile liquid product is one of a cream or a gel.

31. A method as defined in claim 24, wherein the sterile liquid product is preservative free.

* * * * *

UNITED STATES PATENT AND TRADEMARK OFFICE
CERTIFICATE OF CORRECTION

PATENT NO. : 7,644,842 B2
APPLICATION NO. : 11/897928
DATED : January 12, 2010
INVENTOR(S) : Daniel Py It is certified that error appears in the above-identified patent and that said Letters Patent is hereby corrected as shown below:

Title Page, (54) and column 1 line 1: delete "DISPENSER HAVING VARIABLE-VOLUME STORAGE CHAMBER AND DEPRESSIBLE ONE-WAY VALVE ASSEMBLY FOR DISPENSING CREAMS AND OTHER SUBSTANCES"

and insert --DISPENSER WITH VARIABLE-VOLUME STORAGE CHAMBER, ONE-WAY VALVE, AND MANUALLY-DEPRESSIBLE ACTUATOR, AND METHOD--

Column 17, line 17, add "a" before "manually engageable surface"

Column 17, line 22, add "a" before "one-way valve"

Column 17, line 26, delete "," after the word "chamber"

Column 17, line 32, add "means" before "for receiving a portion"

Signed and Sealed this

Thirtieth Day of March, 2010

David J. Kappos
*Director of the United States Patent and Trademark Office*